(12) United States Patent
Shea et al.

(10) Patent No.: US 12,202,422 B2
(45) Date of Patent: Jan. 21, 2025

(54) VEHICLE TELEMATICS OF VEHICLE CRASHES

(71) Applicant: Cambridge Mobile Telematics Inc., Cambridge, MA (US)

(72) Inventors: Kimberly Shea, On (CA); Geronimo Mirano, Cambridge, MA (US); Jun-geun Park, Cambridge, MA (US); William Bradley, Arlington, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 17/554,264

(22) Filed: Dec. 17, 2021

(65) Prior Publication Data

US 2022/0281398 A1    Sep. 8, 2022

Related U.S. Application Data

(63) Continuation of application No. 16/289,797, filed on Mar. 1, 2019, now Pat. No. 11,203,315, which is a
(Continued)

(51) Int. Cl.
*B60R 21/0132* (2006.01)
*B60R 21/00* (2006.01)
(Continued)

(52) U.S. Cl.
CPC .......... *B60R 21/0132* (2013.01); *G07C 5/008* (2013.01); *B60R 2021/0027* (2013.01);
(Continued)

(58) Field of Classification Search
CPC ........ B60R 21/0132; B60R 2021/0027; B60R 2021/01088; B60R 2021/01252;
(Continued)

(56) References Cited

U.S. PATENT DOCUMENTS 6,076,028 A  *  6/2000  Donnelly .............. B60R 21/013
                                              701/45
6,185,490 B1    2/2001  Ferguson
(Continued)

FOREIGN PATENT DOCUMENTS

JP       2013-207618 A     10/2013
WO       WO 2015/166314    11/2015

OTHER PUBLICATIONS

Application and allowed claims for U.S. Appl. No. 16/035,861, filed Jul. 16, 2018.
(Continued)

*Primary Examiner* — Tyler D Paige
(74) *Attorney, Agent, or Firm* — Fish & Richardson P.C.

(57) ABSTRACT

Among other things, a documentation of a crash involving a vehicle is generated automatically. Telematics data is received that has been produced by one or more sensors associated with a telematics device at the vehicle. Based on the telematics data, a vehicle crash period is determined that begins at a start time and ends at an end time of the vehicle crash. Based on the telematics data, one or more metrics are determined associated with the vehicle during the vehicle crash period. Based on one or more metrics, a human-readable documentation of the vehicle crash is generated automatically.

20 Claims, 15 Drawing Sheets

Related U.S. Application Data continuation of application No. 16/035,861, filed on Jul. 16, 2018, now Pat. No. 10,246,037.

(51) Int. Cl.
*B60R 21/01* (2006.01)
*G07C 5/00* (2006.01)
*G07C 5/08* (2006.01)

(52) U.S. Cl.
CPC ............... *B60R 2021/01088* (2013.01); *B60R 2021/01252* (2013.01); *B60R 2021/01325* (2013.01); *G07C 5/0816* (2013.01)

(58) Field of Classification Search
CPC .......... B60R 2021/01325; G07C 5/008; G07C 5/0816; G07C 5/085
USPC .......................................................... 701/36
See application file for complete search history.

(56) References Cited

U.S. PATENT DOCUMENTS

| | | | |
|---|---|---|---|
| 6,618,668 | B1 | 9/2003 | Laird |
| 7,180,407 | B1 | 2/2007 | Guo et al. |
| 7,359,821 | B1 | 4/2008 | Smith |
| 8,457,880 | B1 | 6/2013 | Malalur et al. |
| 8,589,015 | B2 | 11/2013 | Willis et al. |
| 8,989,952 | B2 | 3/2015 | Simon |
| 9,087,362 | B2 | 7/2015 | Hertenstein |
| 9,349,225 | B2 | 5/2016 | Wanami |
| 9,392,431 | B2 * | 7/2016 | Barfield, Jr. ............ G07C 5/008 |
| 9,406,222 | B2 | 8/2016 | Hergesheimer et al. |
| 9,491,420 | B2 | 11/2016 | Mimar |
| 9,628,975 | B1 | 4/2017 | Watkins |
| 9,650,007 | B1 | 5/2017 | Snyder |
| 9,672,719 | B1 | 6/2017 | Hollenstain et al. |
| 9,707,971 | B2 * | 7/2017 | Takahashi ............. B60W 50/14 |
| 9,886,841 | B1 | 2/2018 | Nave |
| 10,055,909 | B2 | 8/2018 | Jenkins et al. |
| 10,246,037 | B1 * | 4/2019 | Shea ................. B60R 21/0132 |
| 10,351,133 | B1 | 7/2019 | Nave |
| 10,417,897 | B1 | 9/2019 | Nave |
| 10,843,691 | B2 * | 11/2020 | Stobbe ................. B60W 30/09 |
| 10,997,800 | B1 * | 5/2021 | Salodkar ............. G07C 5/0808 |
| 11,203,315 | B2 * | 12/2021 | Shea ................. B60R 21/0132 |
| 2003/0114972 | A1 | 6/2003 | Takafuji et al. |
| 2003/0182035 | A1 | 9/2003 | DiLodovico et al. |
| 2004/0122639 | A1 | 6/2004 | Qiu |
| 2004/0215382 | A1 | 10/2004 | Breed et al. |
| 2005/0038580 | A1 | 2/2005 | Seim |
| 2007/0073450 | A1 | 3/2007 | Ampunan et al. |
| 2008/0119983 | A1 | 5/2008 | Inbarajan et al. |
| 2009/0002491 | A1 | 1/2009 | Haler |
| 2009/0051510 | A1 | 2/2009 | Follmer |
| 2010/0030540 | A1 * | 2/2010 | Choi ..................... G01S 5/0027 342/357.31 |
| 2010/0088163 | A1 | 4/2010 | Davidson et al. |
| 2010/0228432 | A1 | 9/2010 | Smith |
| 2011/0130906 | A1 | 6/2011 | Mayer |
| 2011/0288721 | A1 | 11/2011 | Christensen et al. |
| 2012/0123806 | A1 | 5/2012 | Schumann, Jr. |
| 2012/0250517 | A1 | 10/2012 | Saarimaki et al. |
| 2012/0277989 | A1 * | 11/2012 | Zeller ............... B60W 30/0953 701/301 |
| 2013/0052614 | A1 | 2/2013 | Mollicone et al. |
| 2013/0317665 | A1 | 11/2013 | Fernandes et al. |
| 2014/0195070 | A1 | 7/2014 | Schimizu et al. |
| 2014/0358358 | A1 | 12/2014 | Jones |
| 2015/0019267 | A1 | 1/2015 | Prieto |
| 2015/0091717 | A1 | 4/2015 | Dobra et al. |
| 2015/0120082 | A1 | 4/2015 | Cuddihy et al. |
| 2015/0145695 | A1 | 5/2015 | Hyde |
| 2015/0246654 | A1 * | 9/2015 | Tadic ...................... G01P 15/02 340/436 |
| 2015/0287130 | A1 | 10/2015 | Vercollone et al. |
| 2015/0302667 | A1 | 10/2015 | Punjabi et al. |
| 2015/0312655 | A1 | 10/2015 | Balakrishnan et al. |
| 2016/0146615 | A1 | 5/2016 | Abhishek |
| 2016/0203656 | A1 | 7/2016 | Bhogal et al. |
| 2017/0017766 | A1 * | 1/2017 | Giraud .................. G16H 40/67 |
| 2017/0053461 | A1 | 2/2017 | Pal et al. |
| 2017/0164158 | A1 | 6/2017 | Watkins |
| 2017/0166217 | A1 * | 6/2017 | Sbianchi ............. H04B 1/1036 |
| 2017/0210323 | A1 | 7/2017 | Cordova |
| 2018/0061151 | A1 | 3/2018 | Chainer |
| 2018/0126938 | A1 | 5/2018 | Cordova et al. |
| 2018/0300964 | A1 * | 10/2018 | Lakshamanan ......... H04L 67/12 |
| 2018/0365772 | A1 | 12/2018 | Thompson |
| 2020/0017048 | A1 | 1/2020 | Shea et al. |
| 2020/0312062 | A1 | 10/2020 | Balakrishnan et al. |
| 2020/0312063 | A1 | 10/2020 | Balakrishnan et al. |

OTHER PUBLICATIONS

Extended European Search Report in EP Appln. No. 19837735.0, dated Jul. 26, 2021, 9 pages.
PCT International Search Report and Written Opinion in International Application No. PCT/US2019/041830, dated Nov. 4, 2019, 19 pages.
PCT Invitation to Pay Additional Fees in International Application No. PCT/US2019/041830, dated Aug. 30, 2019, 2 pages.
Richards, D.C., Road Safety Web Publication No. 16, "Relationship between Speed and Risk of Fatal Injury: Pedestrians and Car Occupants," Department for Transport, London, Sep. 2010, 41 pages.
BR Office Action in Brazilian Appln. No. BR112021000351-7, dated Sep. 13, 2022, 6 pages (with English translation).
IN Office Action in Indian Appln. No. 202147001515, dated Oct. 25, 2022, 7 pages.
JP Japanese Office Action in Japanese Appln. No. 2021-502572, dated Aug. 3, 2022, 13 pages (with English translation).
Matsushita, OBDII adaptor and Torque Pro, CarCLUB Cruise, Japan, Jan. 7, 2013, from URL <http://cruise1999.blog96.fcs.com/blogentry-272.html02>, 11 pages.
[No Author Listed] [online], "Introducing SFara Guardian: The First Always-On, Always-Ready Personal Safety Solution," BusinessWire, Feb. 22, 2018, retrieved from URL<https://www.youtube.com/watch?v=UELIBmgXHnA>, 1 pages [Video Submission].
[No Author Listed] [online], "SFara Guardian iPhone App Video Review," TheiPhoneAppReview, May 16, 2018, retrieved from URL<https://www.youtube.com/watch?v=XFeW1uCXcgw>, 2 pages [Video Submission].
[No Author Listed] [online], "What is sFara Guardian," Sfara, Jan. 15, 2018, retrieved from URL<https://www.youtube.com/watch?v=PPwLUvqOZZI>, 1 pages [Video Submission].
Apptopia [online], "Sfara Guardian Personal Safety," Dec. 4, 2017, retrieved from URL<https://apptopia.com/ios/app/1300227015/about>, 1 pages.
Businesswire [online], "Adding Multimedia Introducing Sfara Guardian: The First Always-On,Always-Ready Personal Safety Solution," Feb. 22, 2018, retrieved from URL<https://www.businesswire.com/news/home/20171206005645/en/ADDING%C2%A0MULTIMEDIA-Introducing-Sfara-Guardian-The-First-Always-On-Always-Ready-Personal-Safety-Solution?utm_campaign=shareaholic&utm_medium=copy_link&utm_source=bookmark>, 2 pages.
Crunchbase [online], "Sfara," retrieved on Jun. 28, 2023, retrieved from URL<https://www.crunchbase.com/organization/sfara/signals_and_news>, 1 pages.

* cited by examiner

VEHICLE TELEMATICS OF VEHICLE CRASHES

RELATED APPLICATIONS

This application is a continuation of U.S. patent application Ser. No. 16/289,797, filed on Mar. 1, 2019, which is a continuation of U.S. patent application Ser. No. 16/035,861, filed on Jul. 16, 2018 (now U.S. Pat. No. 10,246,037). The contents of the foregoing applications are incorporated by reference herein.

BACKGROUND

This description relates to vehicle telematics of vehicle crashes.

Automotive safety organizations and insurance claim adjustors have a great interest in understanding the events surrounding a vehicle crash. Typically, experts have attempted to reconstruct a crash using measurements taken at the crash site after the crash. Reconstructing and understanding the details of a crash after the fact is difficult, time-consuming, and often inaccurate. Advances in vehicle telematics make it possible to collect vehicle motion data before, during, and after a crash.

SUMMARY

In general, in an aspect, a documentation of the crash involving a vehicle is generated automatically. Telematics data is received that has been produced by one or more sensors associated with a telematics device at the vehicle. Based on the telematics data, a vehicle crash period is determined that begins at a start time and ends at an end time of the vehicle crash. Based on the telematics data, one or more metrics are determined associated with the vehicle during the vehicle crash period. Based on one or more metrics, a human-readable documentation of the vehicle crash is generated automatically.

Implementations may include one or a combination of two or more of the following features. Using a crash detection component and based on a crash detection model, a probability is calculated that the telematics data is associated with a vehicle crash. The human-readable documentation includes a description of the vehicle crash including a narrative of the one or more metrics. The human-readable documentation of the vehicle crash is displayed. Using a crash metrics component and based on the telematics data, a first rate of altitude change and a second rate of altitude change are calculated. Using the crash metrics component, a difference is calculated between the first rate of altitude change and the second rate of altitude change. Using the crash metrics component, is determined that an airbag associated with the vehicle was deployed based on the difference satisfying a predetermined threshold. Using a crash metrics component and based on the telematics data, one or more peak acceleration values are calculated for at least one axis associated with the telematics device. Using the crash metrics component and based on the one or more peak acceleration values, an acceleration event is calculated that includes no more than one peak acceleration value for each of the at least one axis associated with the telematics device. Using the crash metrics component and based on the acceleration event, a qualitative measure of acceleration is determined for each of the at least one axis associated with the telematics device. Based on the acceleration event, a direction of a vehicle impact of the vehicle is calculated. Based on the acceleration event, a maneuver of the vehicle before a vehicle impact is calculated. The based on the one or more metrics, a severity score of the vehicle crash is calculated. Based on the telematics data, a human gait occurring after the start time of the vehicle crash period is identified. The automatic generation of the human-readable documentation includes deriving features of the crash from the telematics data. The features of the crash include an event prior to a first impact of the crash. The features of the crash include an event after a final impact of the crash. The features of the crash include vehicle speed. The features of the crash include an event after a first impact of the crash and before a final impact of the crash. The features of the crash include events determined with respect to a largest impact of the crash. The features of the crash include features associated with a position or orientation of the vehicle during the crash. The human-readable documentation includes a crash narrative. The generation of the human-readable documentation includes assembling predetermined prose phrases corresponding to the features of the crash. The prose phrases identify times. The prose phrases identify locations or orientations. The prose phrases identify speeds.

In general, in aspect, a vehicle telematics system automatically generates a documentation of a vehicle crash. The system includes a processor and storage for instructions executable by the processor to perform the following activities: obtain telematics data from one or more sensors associated with a telematics device; calculate, based on the telematics data, a vehicle crash period that begins at a start time and ends at an end time of the vehicle crash; determine, based on the telematics data, one or more metrics associated with a vehicle during the vehicle crash period; and automatically provide, based on the one or more metrics, a human-readable documentation of the vehicle crash.

Implementations may include one or a combination of two or more of the following features. The one or more sensors include at least one of an accelerometer, a speedometer, a barometer, a gyroscope, a compass, and a position sensor. The system includes a user interface for displaying the human-readable documentation of the vehicle crash. The human-readable documentation of the vehicle crash includes a description of the vehicle crash including a narrative of the one or more metrics. The one or more metrics include at least one of a crash duration, a number of impacts, a mean acceleration, a yaw during the vehicle crash, a direction of vehicle impact, an indication of airbag deployment, an indication of vehicle rollover, an indication of a vehicle maneuver, an indication of whether the vehicle was driven post-crash, and an indication of environmental conditions during the vehicle crash. The system includes communications circuitry to communicate one or more of the telematics data, the vehicle crash period, the one or more metrics, and the human-readable documentation of the vehicle crash to a remote server. The remote server is associated with at least one of an automotive safety organization, an insurance company, an emergency service, a user of the telematics device, or a user of the vehicle. The telematics device includes a mobile device. Additional instructions are executable by the processor to: calculate, by a crash detection component and based on a crash detection model, a probability that the telematics data is associated with a vehicle crash. Additional instructions are executable by the processor to: identify, based on the telematics data, a human gait occurring after the start time of the vehicle crash period.

These and other aspects, features, and implementations (a) can be expressed as methods, apparatus, systems, components, program products, methods of doing business, means or steps for performing a function, and in other ways and (b) will become apparent from the following description, including the claims.

DESCRIPTION

Figure 1:
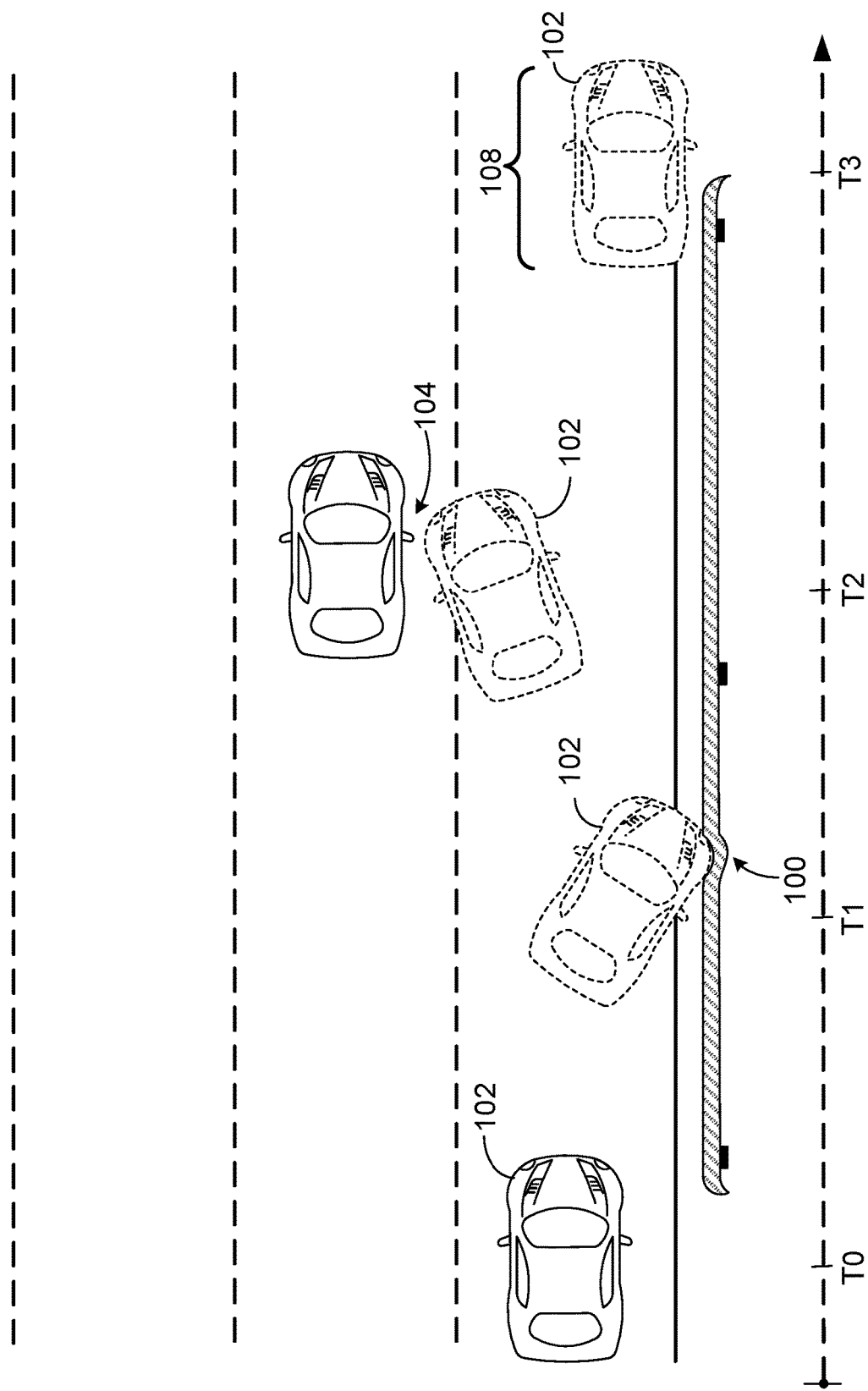
FIG. 1 is a top view of a vehicle crash.

We use the term "vehicle crash" broadly to include, for example, any impact or set of impacts between a vehicle and one or more objects such as another vehicle, a pedestrian, an animal, a stationary object, or road debris, and any impact or set of impacts between a vehicle and the ground, such as during a vehicle rollover.

We use the term "vehicle crash period" broadly to include, for example, any period of time that spans some or all vehicle impacts occurring in the course of a vehicle crash. In some examples, the vehicle crash period can also include periods of time prior to and leading to an initial vehicle impact and periods of time after and resulting from a final vehicle impact.

We use the term "trip data" broadly to include, for example, a segment of a vehicle's telematics data accumulated during a trip between two locations. In some examples, data accumulated during a vehicle crash period represents a part or segment of trip data.

We use the term "vehicle" broadly to include, for example, any kind of ground conveyance such as a car, truck, bicycle, motorcycle, or recreational vehicle, among others.

We use the term "telematics data" broadly to include, for example, any kind of information about vehicle motion, vehicle state, operator state or behavior, or other information captured at the vehicle, for instance, and communicated wirelessly to another device or location at or remote from the vehicle. In some cases, telematics data includes information that has been captured at the vehicle and processed at the vehicle to derive other telematics data, such as summary telematics data.

We use the term "crash metrics" broadly to include, for example, any measure, figure of merit, or other value that characterizes any aspect or feature of a vehicle impact, vehicle crash, or a vehicle motion, vehicle state, operator state or behavior, or other information associated with a vehicle crash. In some cases, the crash metrics are based on telematics data or other information for a vehicle during a vehicle crash period. The crash metrics can be determined from the telematics data using algorithms, formulas, translations, or any other computational process.

In some implementations, the technology described here uses telematics data or an analysis of telematics data (and in some cases other information) to detect a vehicle crash, a vehicle crash period, a start and an end of the vehicle crash period, one or more crash metrics for the vehicle crash period, and one or more crash scores for a vehicle crash. Based on the telematics data, the results of the analysis, the crash metrics, or the scores, or combinations of them, the technology automatically, for example, generates and provides one or more human-readable documentations (e.g., descriptions) of the vehicle crash that present telematics data, the results of the analysis, the crash metrics, or the scores, or other information, or combinations of them. Other activities can also be performed. We sometimes refer to the technology (hardware, software, or both) as a "vehicle crash system" or simply as "the system."

As shown in FIG. 1, a vehicle crash during a trip may be considered to occur during a vehicle crash period beginning at a time T0 prior to a first impact 100 at a time T1 of a vehicle 102 that is involved in the vehicle crash. The vehicle's location, speed, acceleration, or trajectory, the state of the vehicle, the state and behavior of an operator of the vehicle, and a variety of other parameters beginning at time T0, may have at least partially led directly and within a short period of time (from T0 to T1) to the first impact. Although in theory activities and events prior to T0 may have led to or contributed to the accident indirectly, they are of less interest to a user trying to understand the causes and nature of the vehicle crash. Although these earlier periods could also be taken into account and used by the system, in the examples that we discuss below, the focus is on the vehicle crash period beginning at time T0.

Typically the period from T0 to T1 has a duration less than 10 seconds (for example, a duration in the range from 1 second to 30 seconds), but in some cases could be longer than 10 seconds. In the illustrated example, the first impact 100 of the vehicle 102 could be an impact against a guard rail. After the first impact, a second impact 104, say against a second vehicle 106 in the example, occurs at a time T2. After the second impact, the vehicle 102 may travel further to a stopping point 108 at the end T3 of the vehicle crash period. Even though, in some sense, the crash has ended just after the second impact, activities and events during the period from T2 to T3 can provide important information about the nature and cause of the vehicle crash. For this reason, in typical examples, the technology is applied to the period from T2 to T3 in addition to the period from T0 to T2. The vehicle crash period is typically only a part of the time that elapses during a complete vehicle trip. In some cases the total duration of a vehicle crash can be as short as five seconds (or even shorter) and can be as long as 15 seconds (or even longer).

The details of the motion of the vehicle (e.g., locations, speeds, and accelerations in various directions) during the vehicle crash period and information about the state of the vehicle, the state and behavior of the operator of the vehicle, and other factors, some of which can be acquired as telematics data are indicative of the timing and occurrence of each of the impacts of the vehicle crash, the effects of the vehicle crash, and the causes of the vehicle crash, among other things. The system acquires and uses the telematics data and other information to detect the vehicle crash, a vehicle crash period, a start and an end of the vehicle crash period, one or more crash metrics for the vehicle crash period, and one or more crash scores for a vehicle crash. As noted earlier, based on the telematics data, the results of the analysis, the crash metrics, or the scores, or combinations of them, the technology automatically, for example, generates and provides one or more human-readable documentations (e.g., descriptions) of the vehicle crash that present telematics data, the results of the analysis, the crash metrics, or the scores, or other information, or combinations of them.

Figure 2:
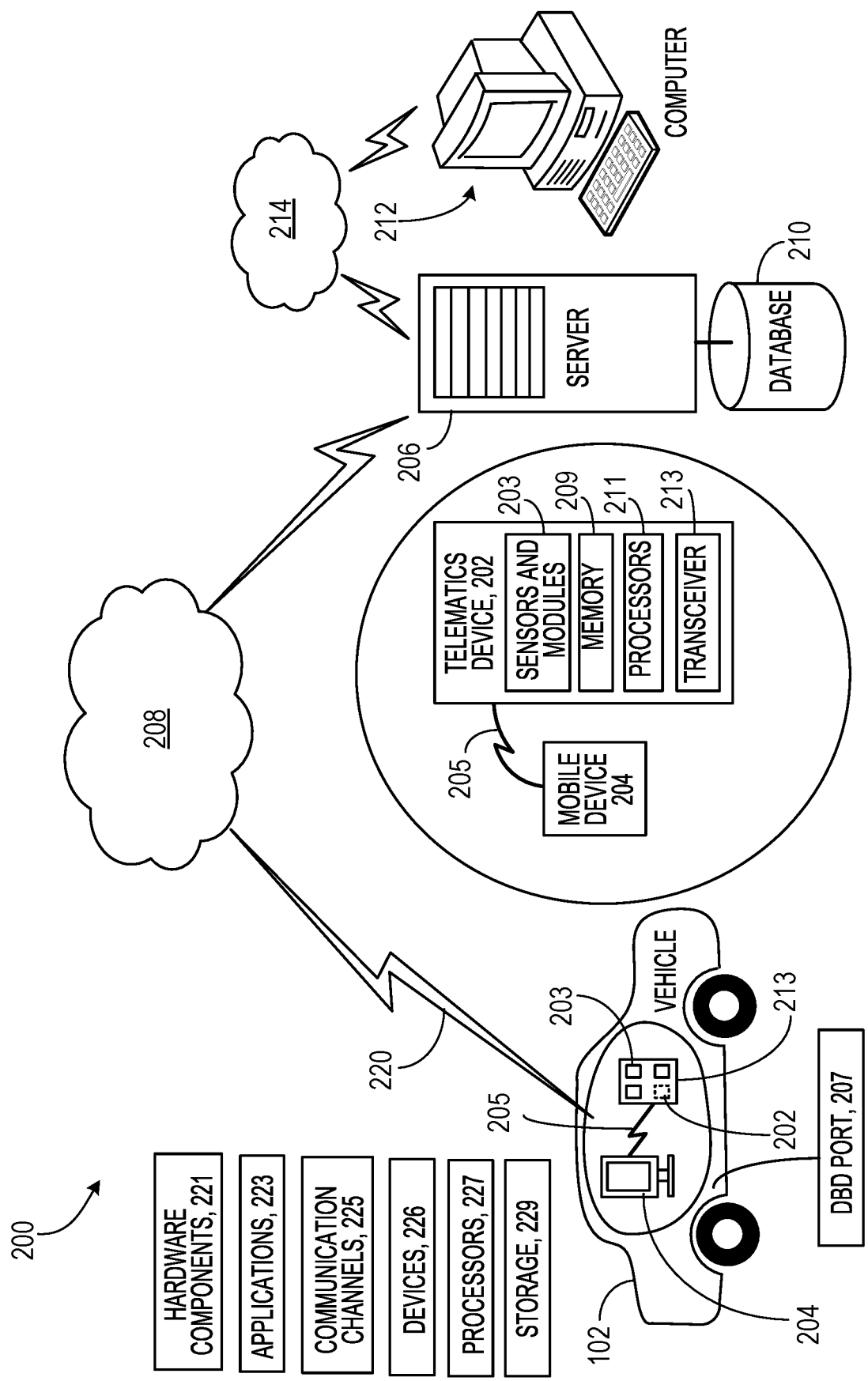
FIGS. 2 through 4 are block diagrams.

As shown in FIG. 2, the automated crash documentation system 200 may include hardware components 221, software applications 223, and data communication channels 225 for communicating data between the hardware components and software applications of devices 226 that are part of the system. Some of the components and devices may be implemented as computer-readable storage mediums 229 containing computer-readable instructions for execution by one or more processors 227 within the system 200. The system 200 shown in FIG. 2 may include additional, fewer, or alternate components, including those discussed above and below. Note that the elements shown at the upper left of FIG. 2 are representative of components and devices that may be distributed among the vehicle, the server, the other computer, and other components shown in FIG. 2 and described here.

As shown in FIG. 2, the system 200 may include a variety of devices that cooperate to perform the activities and functions described here. The devices can include a telematics device 202 in or on a vehicle 102, a mobile device 204, a server 206, and a computer 212. The telematics device 202 may include sensors and modules 203 to measure, process, and communicate telematics data associated with the vehicle 102. For example, the telematics device 202 may include (as the sensors and specialized modules 203) one or more position sensors, such as a Global Positioning System (GPS), to detect locations and speeds of a vehicle, accelerometers to detect accelerations of a vehicle in one or more dimensions, gyroscopes, speed sensors, or barometric sensors, among others. Generally the telematics device 202 may include any number of other sensors or modules to detect data related to a state of a vehicle or a state or behavior of an operator of the vehicle, such as one or more weight sensors, engine sensors, alternator sensors, vibration sensors, voltage sensors, oxygen sensors, biometric sensors, electronic control unit (ECU) devices, cameras, or microphones, or combinations of them, among others. The telematics device 202 can also include memory 209 and one or more processors 211 to process and store data and a transceiver 213 to enable wired or wireless communications with other components or devices of the system 200, as discussed below.

In some cases, the telematics device 202 may be an aftermarket telematics device connected, for example, through an On-Board Diagnostics (OBD) port 207 of the vehicle 102 or an OEM telematics device that is installed during manufacture of the vehicle 102. In some examples, the telematics device 202 may be a tag device placed or affixed in the vehicle 102, such as tags of the kind described in U.S. patent application Ser. No. 14/529,812, entitled "System and Method for Obtaining Vehicle Telematics Data," filed Oct. 31, 2014, the entire contents of which are incorporated by reference. In some implementations, the telematics device 202 may include a smartphone, wearable device, or other device that is portable 204 and may not necessarily be a dedicated telematics device and may not necessarily be connected to an OBD port of the vehicle. The telematics device 202 can be battery-powered, connected into the electrical system of the vehicle 102, or both.

In some implementations, the telematics device 202 may communicate telematics data over a wireless channel 205 to a mobile device 204 or through a mobile device to a server. The mobile device 204 may be a portable computing device, such as a smartphone, tablet computer, laptop computer, or wearable computing device, brought into the vehicle 102 temporarily, for example, by an operator of the vehicle. To facilitate communications, a wired or wireless communication channel 205 such as Bluetooth, WiFi, Radio-Frequency Identification (RFID), or Near-Field Communication (NFC), or combinations of them, for example, may be established between the telematics device 202 and the mobile device 204. The mobile device 204 is not required to be present in the vehicle 102 at all times, however, since the telematics device 202 can collect and store data for later transfer to the mobile device 204 (and through the mobile device to a server) when the mobile device is present and communicatively coupled. Furthermore, although the telematics device 202 is described as being separate from the mobile device 204, in some implementations the functions of the telematics device 202 and the mobile device 204 are combined by, for example, using GPS, accelerometers, barometers, gyroscopes, or other sensors and modules built into the mobile device 204. In this manner, the mobile device 204 can obtain telematics data associated with the vehicle 102 in place of or as a supplement to the data obtained by the telematics device 202.

After receiving or otherwise obtaining telematics data associated with the vehicle 102, the mobile device 204 can, in some implementations, transmit 220 the telematics data to a central server 206 over a network 208, which may be the Internet, a cellular network, a local area network, a wide area network, a satellite network, or any other suitable data transmission network, or combinations of them. The central server 206 may then store the telematics data, along with other user and vehicle information, in a database 210 that can communicate with the central server 206. The database 210 may be implemented using one or more non-transitory computer-readable storage mediums including, but not limited to, hard disk drives, solid state drives, optical storage drives, or any combination thereof.

Figure 3:
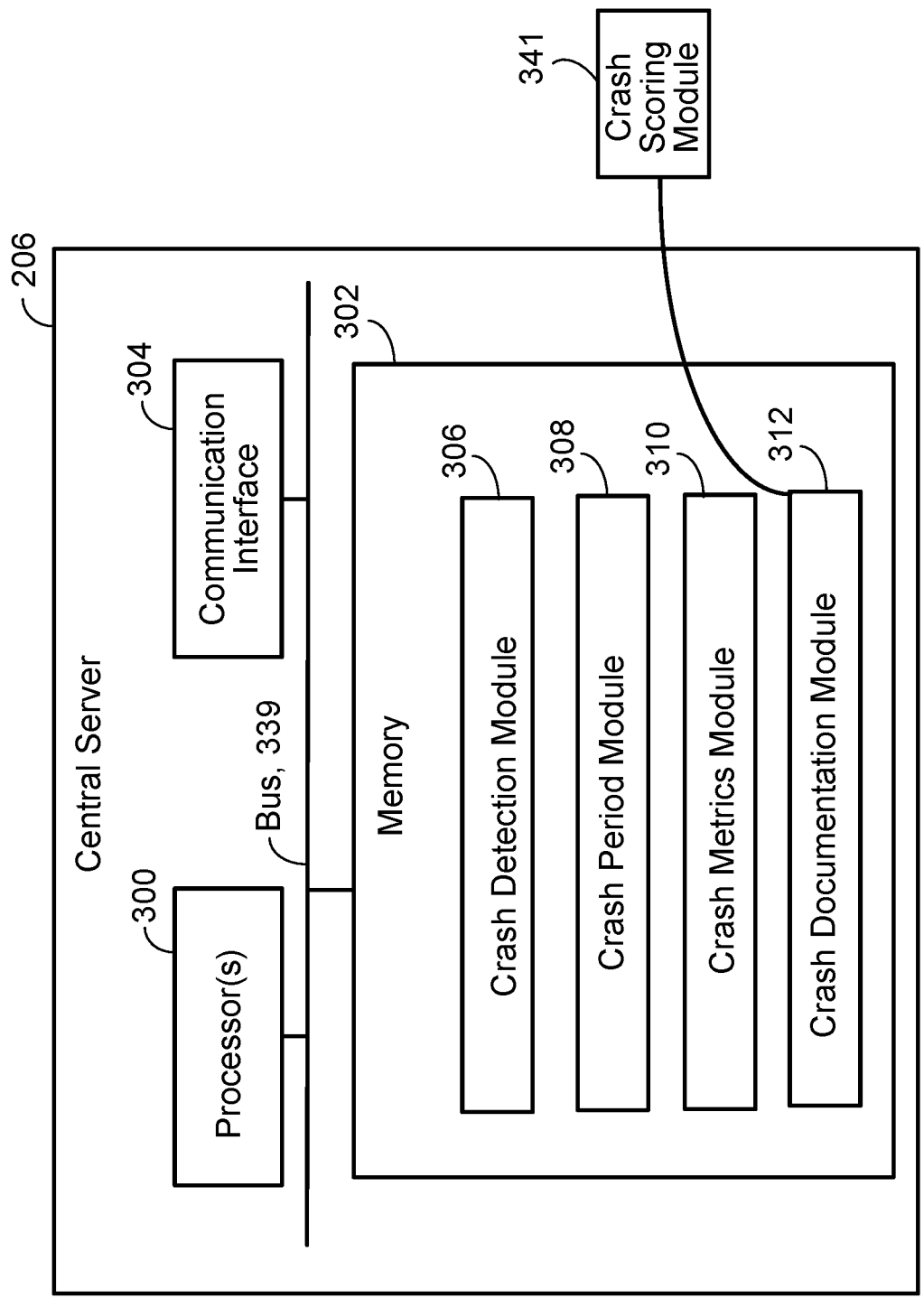

Referring to FIG. 3, the central server 206 may include hardware and software components, such as one or more processors 300, a memory 302, and a communication interface 304, which are interconnected by a data bus 339. The memory 302 can be any non-transitory computer-readable storage medium and may store computer-readable instructions executable by the processor(s) 300. The memory 302 may store executable instructions associated with an impact and crash detection module 306 (which we sometimes call more simply a "crash detection module"), a crash period module 308, an impact and crash metrics module 310 (which we sometimes call more simply a "crash metrics module"), a crash scoring module 341, and an impact and crash documentation module 312 (which we sometimes call more simply a "crash documentation module") to enable the central server 206 or other components and devices to carry out the techniques described here, such as processing telematics data and other information to detect whether the vehicle 102 experienced a vehicle impact or a vehicle crash, determining crash metrics for the vehicle crash period, and automatically providing a human-readable documentation of the vehicle impact or vehicle crash. We sometimes use the phrase "vehicle crash" alone or with other words to refer to a vehicle crash or a vehicle impact or both.

We use the term "module" broadly to include, for example, any code, program, software object, or other software device or arrangement that can be executed by processor to perform one or more activities, functions, or facilities.

The central server 206 or other components or devices can use the communication interface 304 to transmit and receive raw or processed data, such as the telematics data, the crash metrics, and the human-readable documentation of the vehicle crash, among other information, to and from other components or devices of the system 200. For instance, the central server 206 or other devices or components may transmit or receive data to or from a database 210 for storage purposes, to or from the mobile device 204 using the network 208, to or from the telematics device 202 or to or from a remote computing device 212 using a network 214, which may be the Internet or any other suitable data transmission network.

The remote computing device 212 may include one or more computing devices or servers or both associated with, for example, an automotive safety organization, an insurance company, an emergency service, a user of the mobile device 204, or an owner of the vehicle 102, or combinations of these parties. The central server 206 can also provide the mobile device 204, the telematics device 202, the remote computing device 212, or combinations of them with software or an interface, such as an application programming interface (API) or a web service, which allows for visualization, interaction, or further processing of the data, for example.

Although the central server 206 is described as processing the telematics data associated with the vehicle 102, other components and devices of the system 200, such as the mobile device 204 or the remote computing device 212, may process the telematics data in addition to, in combination with, or instead of the central server 206 to carry out the techniques described here. Although only one central server 206, one database 210, and one remote computing device 212 are illustrated in FIG. 2, the system 200 may include any number of computing devices and data storage devices (located in a single place or distributed and) communicatively connected using any number of networks.

Figure 4:
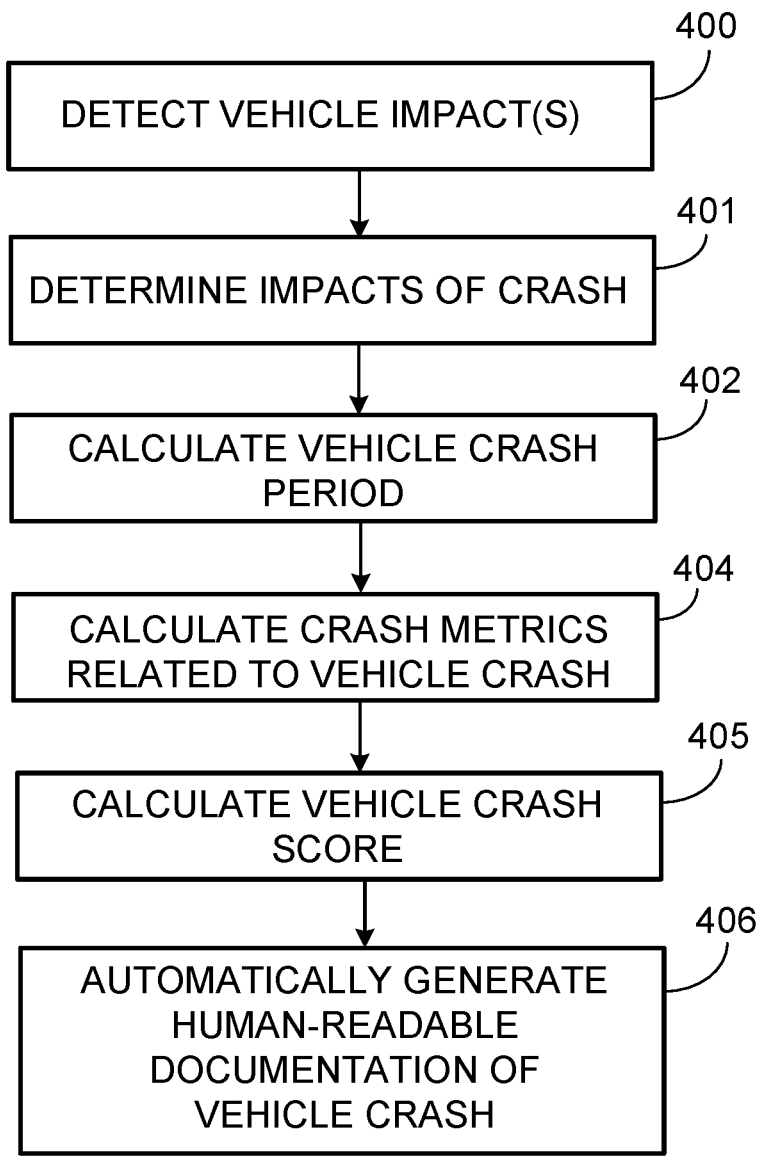

As shown in FIG. 4, a process for automatically generating a human-readable documentation of a vehicle crash can include activities, for example a sequence of activities, that include detecting one or more vehicle impacts 400 individually or as part of a vehicle crash, determining from the one or more vehicle impacts that a vehicle crash has occurred 401, calculating a vehicle crash period 402, calculating crash metrics related to the vehicle crash 404, calculating vehicle crash scores 405, and automatically generating human readable documentation of the vehicle crash 406. In some instances, the automated crash documentation system 200 may provide a human-readable documentation of a vehicle crash for a given vehicle crash period, such as vehicle crash period T0-T3 shown in FIG. 1. In some cases, the system may use, for example, the crash detection module 306 to first detect one or more likely vehicle impacts or vehicle crashes over an entire vehicle trip (step 400). The system may then provide a human-readable documentation of some or all of the likely vehicle crashes including vehicle impacts during the trip.

Figure 5:
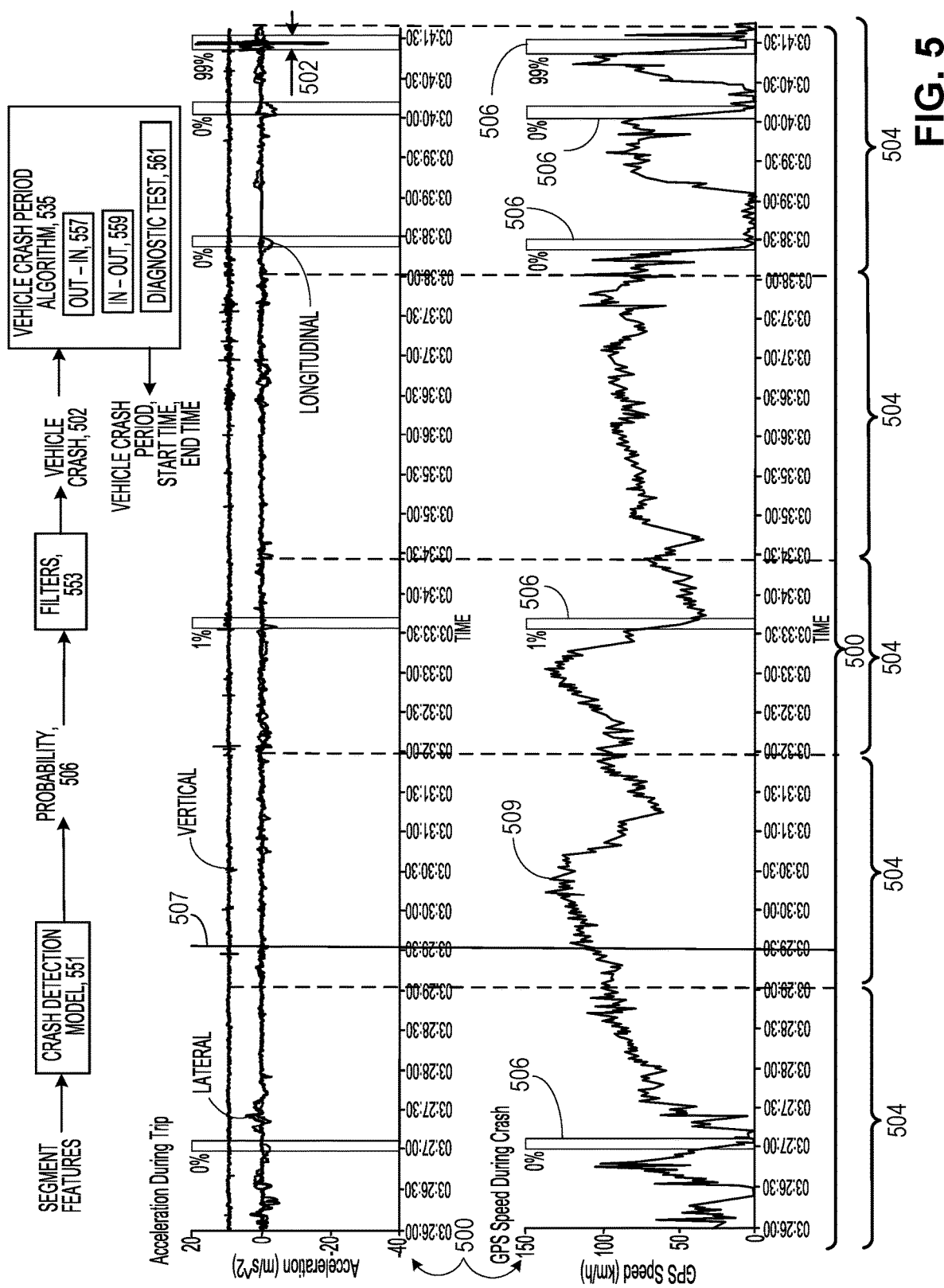
FIGS. 5 through 8 are graphs of parameters against time.

Referring to FIG. 5, detecting vehicle impacts, vehicle crashes, and vehicle crash periods over an entire vehicle trip (only a portion of which is shown in FIG. 5) includes causing the vehicle crash detection module 306 of the system 200 to identify by computation one or more likely vehicle impacts 502 based on telematics data 504 (and other information) at each point in time or during brief segments of time spanning multiple time points within the time period of the vehicle trip, to determine if the telematics data indicates a vehicle impact or a vehicle crash (including one or more impacts). The telematics data in the example shown in FIG. 5 includes acceleration data 505 (along three axes, longitudinal, latitudinal, and vertical) at successive times 507 during the vehicle trip (the upper graph) and the GPS speeds 509 determined at successive times 507 during the vehicle trip, including during portions of the vehicle crash period.

For example, the system (e.g. the server or other devices or components) may split the telematics data 504 associated with the portion of the trip 500 into segments, such as 3-second segments (although the length of each segment can be within a range from about one second to about 10 seconds in various implementations), and then compute and store one or more of the following features with respect to each segment using the telematics data 504:

accel_after_span—if telematics data is present after the end of the segment, then we determine this amount of acceleration after the segment as follows: starting three seconds after the crash and continuing for up to thirteen seconds after the crash (the periods could differ from those values in other examples), we compute the magnitude of the difference between each acceleration data point and the median acceleration during the period of 10 seconds surrounding the data point (i.e., with the data point centered in the 10-second period), and from these difference values we take as the amount of the acceleration after the segment the $90^{th}$ percentile magnitude. If no telematics data if present three seconds after the end of the segment, then the acceleration is taken as accel_after_span=0); in some implementations, the number of data points per 3-second segment is 45; in the example discussed later, the number of data points per 3-second interval is 9; other rates of data point collection could be used.

accel_impact_max—raw maximum magnitude deviation of each acceleration within the segment from a 10-second windowed median acceleration;

accel_impact_offset—number of seconds into the segment when the maximum magnitude deviation of acceleration from the 10-second windowed median acceleration occurs;

accel_impact_offset_rel—fraction of the time into the segment when the maximum magnitude deviation of acceleration from the 10-second windowed median acceleration occurs;

accel_impact_speed—GPS speed immediately before the maximum magnitude deviation of acceleration from the 10-second windowed median acceleration;

crash_like—boolean variable indicating that the telematics data for the segment suggests the occurrence of a vehicle impact and therefore a vehicle crash. The Boolean variable takesvalue 1 or 0 depending on whether the following equation is true or false: time_before_end<180 [seconds] and frac_into_drive>0.8 and gps_speed_since<10 [kilometers per hour] and accel_after_span<10 [m/s$^2$] and accel_impact_max>15 [m/s$^2$] and accel_impact_offset<10 [m/s$^2$];

duration—length of the segment [seconds];

frac_into_drive—fraction into the duration of the vehicle trip that the segment starts (for example, if the segment is at the beginning of the trip, frac_into_drive is 0. If the segment is at the end of the trip, frac_into_drive is 1);

time_before_end—number of seconds from the start of this segment to the end of the trip;

gps_accel_avg—the average change in GPS speed during the segment assuming a trapezoidal interpolation for the segment;

gps_accel_min—the minimum GPS-speed-derived acceleration during the segment;

gps_speed_after—GPS speed at the end of the segment;

gps_speed_change—the net change in GPS speed from the beginning of the segment to the end of the segment;

gps_speed_since—GPS speed after the end of the segment, such as the speed that is at the 75th percentile of all data points of the GPS speed occurring more than 5 seconds after the end of the segment. If no data points occur more than 5 seconds after the end of the segment, then gps_speed_since is 0.

Figure 13:
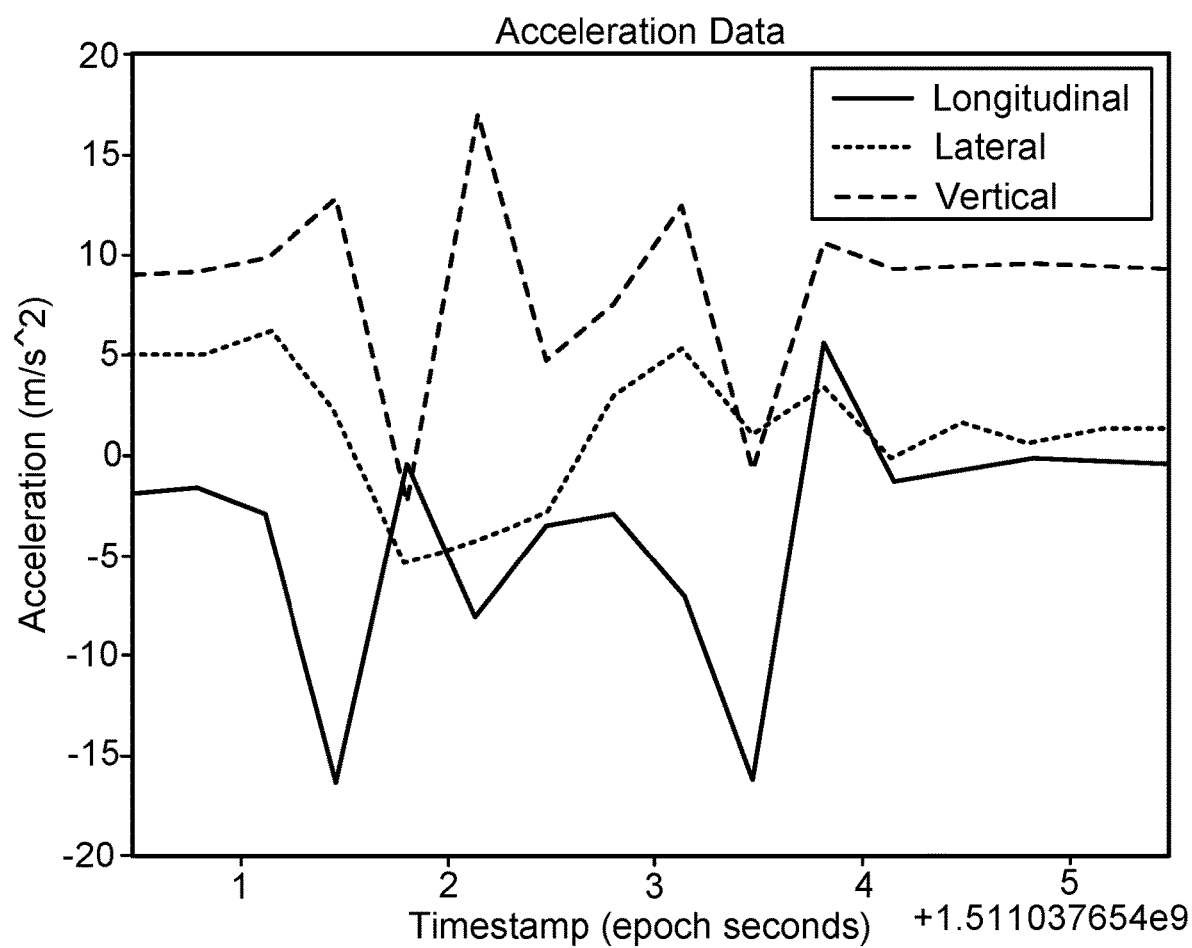
FIG. 13 is a plot of acceleration data.

The following tables (and FIG. 13) illustrate a specific example of the computations described above.

The tables are based on a trip start and a trip end represented by the following time stamps:

Trip Start Timestamp: 1511036759.14 seconds
Trip End Timestamp: 1511037668.81 seconds In this example, the trip includes the segment data points occurring during a particular 3-second segment The segments for the rest of the trip's data points are omitted for brevity:

| Timestamp (epoch seconds) | Longitudinal Acceleration (m/s²) | Lateral Acceleration (m/s²) | Vertical Acceleration (m/s²) | GPS Speed (m/s) |
|---|---|---|---|---|
| 1511037656.14 | −8.23 | −4.29 | 16.95 | 13.36 |
| 1511037656.47 | −3.57 | −2.89 | 4.63 | 12.52 |
| 1511037656.81 | −3 | 2.96 | 7.43 | 11.63 |
| 1511037657.14 | −7.04 | 5.4 | 12.6 | 10.83 |
| 1511037657.47 | −16.14 | 1.09 | −0.73 | 9.97 |
| 1511037657.81 | 5.63 | 3.38 | 10.45 | 9.17 |
| 1511037658.14 | −1.24 | −0.23 | 9.24 | 8.32 |
| 1511037658.47 | −0.75 | 1.63 | 9.35 | 7.52 |
| 1511037658.81 | −0.18 | 0.6 | 9.54 | 6.95 |

| The following table shows additional derived data for each of the data points of the segment: Timestamp (epoch seconds) | GPS Accel (m/s2) | Median Longitudinal Acceleration (m/s2) | Median Lateral Acceleration (m/s2) | Median Vertical Acceleration (m/s2) | L2-Norm Accel Minus Median (m/s2) |
|---|---|---|---|---|---|
| 1511037656.14 | 2.62 | −1.265 | 2.44 | 9.34 | 12.32 |
| 1511037656.47 | 2.72 | −1.265 | 2.34 | 9.34 | 7.41 |
| 1511037656.81 | 2.77 | −1.205 | 1.91 | 9.34 | 2.82 |
| 1511037657.14 | 2.53 | −1.16 | 1.46 | 9.355 | 7.79 |
| 1511037657.47 | 2.55 | −0.95 | 1.285 | 9.355 | 18.23 |
| 1511037657.81 | 2.46 | −0.68 | 1.28 | 9.355 | 6.74 |
| 1511037658.14 | 2.51 | −0.575 | 1.265 | 9.355 | 1.64 |
| 1511037658.47 | 2.45 | −0.52 | 1.25 | 9.355 | 0.44 |
| 1511037658.81 | 2.22 | −0.44 | 1.245 | 9.355 | 0.72 |

The following table shows time-stamped data points occurring between 3 and 13 seconds after the end of the segment to offer clarity on the computation of the feature accel_after_span:

| Timestamp (epoch seconds) | Longitudinal Acceleration (m/s²) | Lateral Acceleration (m/s²) | Vertical Acceleration (m/s²) | GPS Speed (m/s) |
|---|---|---|---|---|
| 1511037662.14 | −0.22 | 1.05 | 9.44 | 0.05 |
| 1511037662.47 | −0.19 | 1.24 | 9.34 | 0.22 |
| 1511037662.81 | −0.06 | 1.25 | 9.46 | 0.21 |
| 1511037663.14 | −0.08 | 1.17 | 9.48 | 0.34 |
| 1511037663.47 | −0.05 | 1.21 | 9.28 | 0.39 |
| 1511037663.81 | −0.15 | 1.05 | 9.53 | 0.55 |
| 1511037664.14 | −0.21 | 0.98 | 9.43 | 0.55 |
| 1511037664.47 | 0.06 | 1.18 | 9.47 | 0.39 |
| 1511037664.81 | −0.02 | 1.05 | 9.36 | 0.47 |
| 1511037665.14 | −0.14 | 1.14 | 9.48 | 0.38 |
| 1511037665.47 | 0.08 | 0.97 | 9.42 | 0.58 |
| 1511037665.81 | −0.21 | 0.7 | 9.2 | 0.61 |
| 1511037666.14 | 0 | 0.88 | 9.37 | 0.5 |
| 1511037666.47 | −0.09 | 0.78 | 9.2 | 0.53 |
| 1511037666.81 | −0.09 | 0.4 | 9.52 | 0.47 |
| 1511037667.14 | −0.06 | 0.27 | 9.52 | 0.64 |
| 1511037667.47 | −0.02 | 0.17 | 9.45 | 0.94 |
| 1511037667.81 | −0.01 | 0.22 | 9.44 | 1.03 |
| 1511037668.14 | 0.08 | 0.09 | 9.47 | 1.36 |
| 1511037668.47 | −0.21 | −0.01 | 9.26 | 1.29 |
| 1511037668.81 | 0.02 | 0.2 | 9.34 | 1.35 |

The following table shows additional data for each of the above data points.

| Timestamp (epoch seconds) | GPS Accel (m/s²) | Median Longitudinal Acceleration (m/s²) | Median Lateral Acceleration (m/s²) | Median Vertical Acceleration (m/s²) | L2-Norm Accel Minus Median (m/s²) |
|---|---|---|---|---|---|
| 1511037662 | 1.87 | −0.185 | 1.155 | 9.415 | 0.11 |
| 1511037662 | 1.18 | −0.165 | 1.12 | 9.415 | 0.14 |
| 1511037663 | 0.41 | −0.145 | 1.12 | 9.425 | 0.16 |
| 1511037663 | 0.29 | −0.145 | 1.09 | 9.425 | 0.12 |
| 1511037663 | 0.17 | −0.13 | 1.09 | 9.435 | 0.21 |
| 1511037664 | 0.34 | −0.13 | 1.065 | 9.435 | 0.1 |
| 1511037664 | 0.21 | −0.12 | 1.065 | 9.425 | 0.12 |
| 1511037664 | 0.0, | −0.12 | 1.05 | 9.43 | 0.23 |
| 1511037665 | 0.08 | −0.105 | 1.05 | 9.435 | 0.11 |
| 1511037665 | 0.17 | −0.09 | 1.05 | 9.44 | 0.11 |
| 1511037665 | 0.19 | −0.09 | 1.05 | 9.44 | 0.19 |
| 1511037666 | 0.14 | −0.09 | 1.05 | 9.44 | 0.44 |
| 1511037666 | 0.12 | −0.085 | 1.015 | 9.435 | 0.17 |
| 1511037666 | 0.05 | −0.08 | 0.98 | 9.43 | 0.3 |
| 1511037667 | 0.14 | −0.07 | 0.975 | 9.435 | 0.58 |
| 1511037667 | 0.14 | −0.06 | 0.97 | 9.44 | 0.7 |
| 1511037668 | 0.41 | −0.06 | 0.925 | 9.435 | 0.76 |
| 1511037668 | 0.56 | −0.06 | 0.88 | 9.44 | 0.66 |
| 1511037668 | 0.72 | −0.055 | 0.83 | 9.435 | 0.75 |
| 1511037668 | 0.35 | −0.05 | 0.78 | 9.43 | 0.82 |
| 1511037669 | 0.32 | −0.04 | 0.74 | 9.435 | 0.55 |

The following features are computed based on the above data points:

| Feature Name | Value | Notes |
| --- | --- | --- |
| accel_after_span | 0.75 m/s$^2$ | 90$^{th}$ percentile of the "L2-Norm Accel Minus Median" values for data after segment. |
| accel_impact_max | 18.23 m/s$^2$ | Maximum of "L2-Norm Accel Minus Median" for data in segment |
| accel_impact_offset | 1.33 seconds | Time of maximum "L2-Norm Accel Minus Median" minus the time of segment start (1511037657.47 − 1511037656.14) |
| accel_impact_offset_rel | 0.50 | accel_impact_offset divided by duration (1.33/2.67) |
| accel_impact_speed | 9.97 m/s | "GPS Speed" at time of maximum "L2-Norm Accel Minus Median" |
| crash_like | 1 | 1 because . . . |
| duration | 2.67 seconds | Segment end time minus segment start time (1511037658.81 − 1511037656.14) |
| frac_into_drive | 0.986 | Segment start time minus trip start time divided by trip end time minus trip start time (897.00/909.66) |
| gps_accel_avg | −2.403 m/s$^2$ | gps_speed_change divided by duration (−6.41/2.667) |
| gps_accel_min | −2.77 m/s | Minimum "GPS Accel" value from segment |
| gps_speed_after | 6.95 m/s | Segment end "GPS Speed" |
| gps_speed_change | −6.41 m/s | Segment end "GPS Speed" minus segment start "GPS Speed" (6.95 − 13.36) |
| gps_speed_since | 0.962 m/s | Average of "GPS Speed" for all data points after the end of the trip (data not included) |
| severity_prob | 0.436 | Probability of severe impact, as determined by a special regression model run on all the other features (model not included) |
| time_before_end | 12.667 seconds | Trip end time minus segment start time (1511037668.81 − 1511037656.14) |

The parameters and corresponding features of the telematics data are combined to reach a conclusion about whether the segment contains a crash. For example, accel_impact_max had a value of 18.55 m/s$^2$ in the above worked example, which is a relatively large value which we would expect to encounter during a real crash. Furthermore, accel_after_span had a value of 0.75 m/s^2, which is a small value which we might expect from a car undergoing relatively little acceleration after a crash, having come to rest. This example in particular corresponds to a segment which can be ruled to have included a crash.

Other parameters and features and corresponding equations may also be effective in inferring that a crash has occurred. For example, the higher-order derivatives of the acceleration signal, the jerk and snap, might offer further evidence of an impact.

After calculating one or more of the above features for each of the segments, the system 200 may feed the features into an impact and crash detection model 551 (which we sometimes call more simply a "crash detection model"), such as a model generated by the crash detection module 306 and stored in the database 210, to determine a probability of a vehicle impact or vehicle crash 506 having occurred beginning during a particular segment. The probability of an impact may be expressed as a simple probability that an impact occurred in that segment or that a crash involving more than one impact began in that segment.

The crash detection model 551 may include a classification model or other algorithm to determine the probability of a crash 506. For instance, the model may be derived from one or more of a random forest, a linear regression, a binary decision tree, pattern matching techniques, neural networks, Gaussian processes, among others, or combinations of them. In some cases, the crash detection model may be trained using one or more of the above features.

Once the probability of an impact or a crash 506 having occurred (or begun to occur) in a segment is determined, the system 200 may apply one or more filters 553 to determine if a particular segment contains or was the start of a likely vehicle impact or vehicle crash 502. For example, if the probability of a crash 506 is above a certain threshold, such as above 80%, above 90%, above 95%, or above 99%, the system may mark the segment as containing or starting a likely vehicle impact or vehicle crash, and may record the time of the vehicle impact or the start of the vehicle crash. The system may also require that a segment's features meet one or more of the following conditions to be considered a likely vehicle impact or vehicle crash: GPS_speed_change of at least −10 m/s and accel_impact_max of at least 4 m/s$^2$; the vehicle impact or vehicle crash is not too soon after the beginning of the trip, when there is a high chance of GPS speed artifact incorrectly suggesting an impactor crash; the GPS should converge to zero after the vehicle crash within about 10 to 12 seconds, including measurement error, so that the duration of the vehicle crash. Should be less than 12 seconds; and the time of the maximum acceleration impact should not be too long after the beginning of the segment in which breaking first occurred, for example, −0.2<accel_impact_offset_rel<0.9.

After detecting one or more likely vehicle impacts or vehicle crashes 502 during the segments associated with the trip 500, the system 200 may, in some implementations, calculate a vehicle crash period 508 for each of the one or more vehicle crashes (step 402). To do so, the system 200 may utilize a vehicle crash period algorithm 535 included in, for example, the crash period module 308 to determine a start time and an end time of a vehicle crash period 502 based on the telematics data 504, the features described above, other information, or combinations of them.

In some implementations, the vehicle crash period algorithm may include two methods for determining a vehicle crash period, referred to here as the "out-in method" 557 and the "in-out method" 559, and a diagnostic test 561. In some implementations, the algorithm may use the out-in method as a first pass, and may fall back to the in-out method if the diagnostic test determines that the out-in algorithm was not successful. (A variety of other vehicle crash algorithms would also be possible based on other analytical approaches. These alternate vehicle crash algorithms include sliding a window across the data and labelling a region of each window as "crash" or "not crash" based on telematics data exceeding thresholds; providing a collection of labelled crash regions to a machine learning algorithm such as a neural net or support vector machine, which can then classify portions of the data stream as "crash" or "not crash"; modeling the data using an internal state, as with a hidden Markov model or LSTM, in which a function of the hidden state provides a "crash" or "not crash" label.)

The out-in method may start with a wide (overly long duration) estimate of the vehicle crash period and may narrow the period until it matches what we call the true duration of the vehicle crash period 508. For instance, the out-in method may begin by partitioning the trip 500 into estimated "before-crash," "crash," and "after-crash" segments. Any segment that ends more than 10 seconds (for example) prior to a start time of the vehicle crash 502 is designated a before-crash segment. Any segment that begins within 10 seconds (for example) after the start time of the vehicle crash period is designated a crash segment. Any segment that begins more than 10 seconds (for example) after the start time of the vehicle crash is designated as an after-crash segment. The start time of the estimated vehicle crash period may be increased (e.g., moved later in time) until the algorithm encounters a sample of the telematics data 504 that satisfies a predetermined threshold, such as acceleration data that differs in any axis by more than 4 m/s$^2$ (for example) from the average oriented acceleration of the before-crash segment, or until the process reaches the start time of the estimated vehicle crash period 508. In addition, the end time of the estimated vehicle crash period may be decreased (moved earlier in time) until the algorithm encounters a sample of the telematics data 504 that satisfies a predetermined threshold, such as acceleration data that differs by more than 4 m/s$^2$ in any axis from the average oriented acceleration of the after-crash segment, or until the algorithm reaches the end time of the vehicle crash period 508. The start and end times of the resulting vehicle crash segment may define the out-in estimate of the vehicle crash period 508 for the particular vehicle crash 502.

The in-out method may start with a narrow (relatively short duration) estimate of the vehicle crash period placed at the time of the vehicle crash (impact) 502 and may extend the duration of the period until it matches the true vehicle crash period 508. For instance, the in-out method may begin by partitioning the trip 500 into estimated "before-crash" and "after-crash" segments. The before-crash segment may correspond to a segment of the telematics data 504 that ends more than 10 seconds prior to the start time of the true vehicle crash 502. The after-crash segment may correspond to a segment of the telematics data that begins more than 10 seconds after the time of the true vehicle crash. Beginning from the starting time of the true vehicle crash, an estimated start time of the vehicle crash period 508 may be determined by moving backwards (e.g., earlier) in time until the algorithm encounters a sample of the telematics data 504 that satisfies a predetermined threshold, such as a 2-second sample of oriented acceleration data that does not differ in any axis by more than 4 m/s$^2$ (for example) from the average oriented acceleration data of the after-crash segment. An estimated end time of the vehicle crash period 508 may be determined by moving forward (e.g., later) in time from the start time of the vehicle crash until the algorithm encounters a sample of the telematics data 504 that satisfies a predetermined threshold, such as a 2-second sample of oriented acceleration data that does not differ in any axis by more than 4 m/s$^2$ (for example) from the average oriented acceleration data of the before-crash segment. The resulting start time and end time may define the in-out estimate of the vehicle crash period 508 for the vehicle crash 502.

After computing estimates of the start time and finish time of the vehicle crash period 508 using the out-in and in-out methods, the crash period algorithm may use a diagnostic test to determine whether the out-in method was successful, for example, by determining whether the out-in estimate of the vehicle crash period has a duration that is less than a predetermined threshold, such as less than 6 seconds (or another appropriate threshold within a range of 1 second and 20 seconds). If the duration of the out-in estimate satisfies the threshold, the algorithm may determine that the vehicle crash period 508 and the start time and end time for the vehicle crash 502 is equal to the out-in estimate of the vehicle crash period and its start time and end time.

If the duration of the out-in estimate does not satisfy the predetermined threshold, the algorithm may determine that the estimate is an abnormally long duration for a crash that needs to be substantiated by the continuous presence of consistent acceleration throughout the vehicle crash, which is checked for by the in-out method. If substantiated on that basis, the algorithm may determine that the vehicle crash period 508 and its start time and end time for the vehicle crash 502 are equal to the in-out estimate of the vehicle crash period and its start time and end time.

In some implementations, the algorithm may not rely on the results of only one of the in-out method or the out-in method, but may take account of the results of both algorithms, for example, based on the minimum, maximum, or average of the out-in and in-out estimates of the vehicle crash period and its start time and end time.

After determining or otherwise obtaining the vehicle crash period for a vehicle crash, the system 200 may determine one or more impact metrics or crash metrics (we sometimes refer to impact metrics or crash metrics more simply as "crash metrics") related to the vehicle crash based on the telematics data associated with the vehicle crash period, among other information (step 404). In some implementations, the system 200 may use the crash metrics module 310 to calculate the one or more crash metrics, as described below.

In some cases, the system 200 may compute one or more of the following crash metrics: the duration of the vehicle crash period, the speeds of the vehicle before, during, and after the vehicle crash period, the difference between the speed at the start time and the speed at the end time of the vehicle crash period, the minimum and maximum lateral, longitudinal, and vertical accelerations of the vehicle before, during, and after the vehicle crash period, the maximum total planar acceleration experienced during the vehicle crash period, the gyroscopic orientation and angular velocity of the vehicle during the vehicle crash period, the GPS coordinates at each moment during the vehicle crash period, whether a vehicle airbag deployed during the vehicle crash period, whether the vehicle rolled over during the vehicle crash period, the time, direction, and description of one or more impacts during the vehicle crash period, driver actions, such as continued driving, braking or accelerating before impact, swerving, evasive maneuvering, or walking after one or more of the impacts, and the severity of the crash, among others, and combinations of two or more of those crash metrics.

Figure 6:
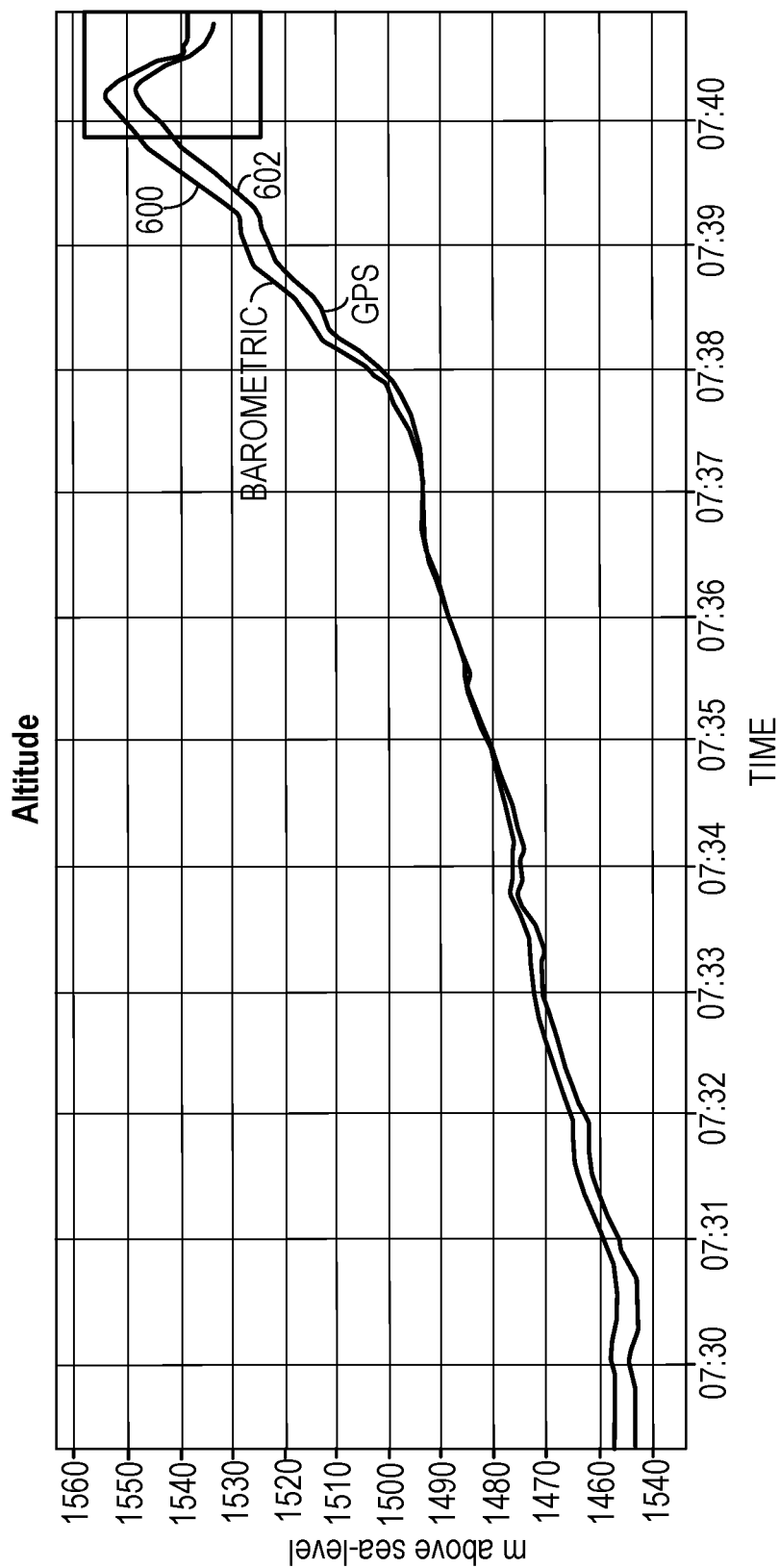

In some implementations, the system 200 may determine whether one or more vehicle airbags were deployed during the vehicle crash period based on, for example, barometric and GPS measurements included in the telematics data. In general, deployment of an airbag produces an increase in air pressure within the vehicle, which results in a downward spike in barometric altitude 600 that is not corroborated by a downward spike in GPS altitude 602, as shown in FIG. 6. Accordingly, the system may detect a discrepancy between the rate of change of the barometric altitude 600 and the rate of change of the GPS altitude 602 to determine if one or more vehicle airbags were deployed. To do so, the system 200 may first compute the first derivative of both the barometric and GPS altitude signals contained in the telematics data. The system 200 may then smooth the derivative signals using one or more filters, such as windowed-average filters of width 5 seconds (or another period within the range of 1 second to 15 seconds) for the GPS signal and of width 2 seconds (or another period within the range of 0.1 seconds to 5 seconds) for the barometric signal and a median filter of width 15 seconds (or another period within the range of 3 seconds to 30 seconds) and taking the 5th percentile values of each signal within the centered window. If the system determines that the difference between the values of the two filtered signals averages out to less than, for example, −0.9 m/s over a 1-second interval (although other thresholds could be used), then the incident may be identified and stored as an airbag deployment, with the time of deployment noted as the latest time within the vehicle crash period satisfying this condition.

Figure 7:
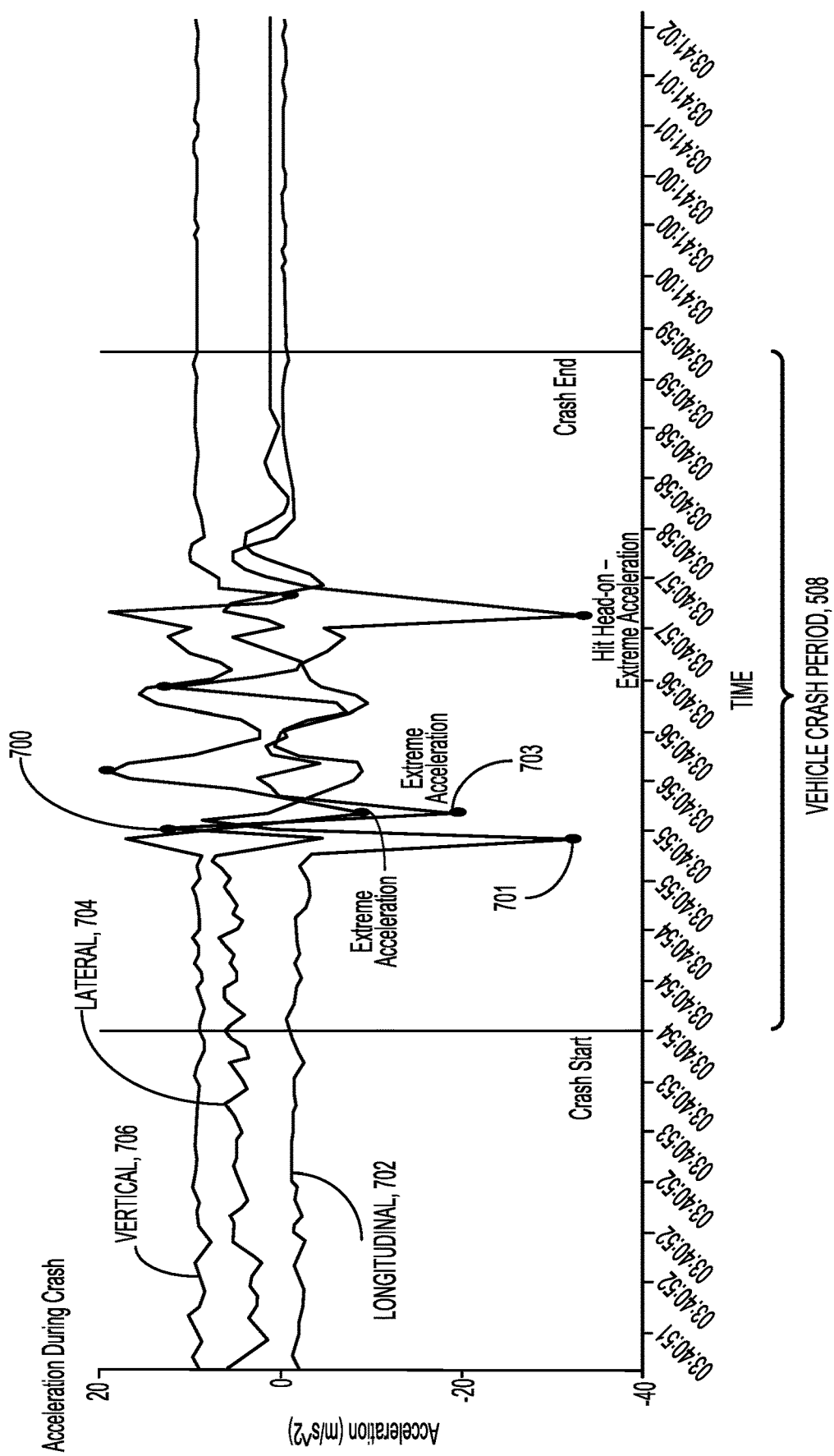

The system 200 may also determine the time or times of one or more impacts during the vehicle crash period and the direction (that is, the relative direction of the impact from the frame of reference of the vehicle) of each impact on the vehicle. As shown in FIG. 7, in some implementations, the system 200 may first identify one or more times of peak acceleration 700 for each of the longitudinal 702, lateral 704, and vertical 706 acceleration signals included in the telematics data associated with the vehicle being tracked. To do so, the system may utilize one or more peak-finding algorithms 560, such as an absolute magnitude peak-finding algorithm which calculates the absolute difference between the longitudinal 702, lateral 704, or vertical 706 acceleration signal and its mean value and the absolute value of the second differential of the acceleration signal. The system may then record each time the absolute difference exceeds, for example, 12 m/s$^2$ (or another value in the range of 5 m/s$^2$ to 25 m/s$^2$) and the absolute second differential (similar . . . ) exceeds, for example, 800 m/s$^4$, (or another value in the range 100 m/s$^4$ to 3200 m/s$^4$) as a peak 700 of the particular acceleration signal. If the absolute magnitude peak-finding algorithm fails to find any peaks 700 in any of the longitudinal 702, lateral 704, or vertical 706 acceleration signals, the system may employ a largest extrema peak-finding algorithm. In the largest extrema algorithm, the system may begin by taking the acceleration signal for a particular axis and subtracting its mean value. The system may then identify the two largest values in the resulting signal that arise from this operation. If either or both of these values are a local extremum, the system may record the time associated with the value(s) as corresponding to a peak 700.

Figure 8:
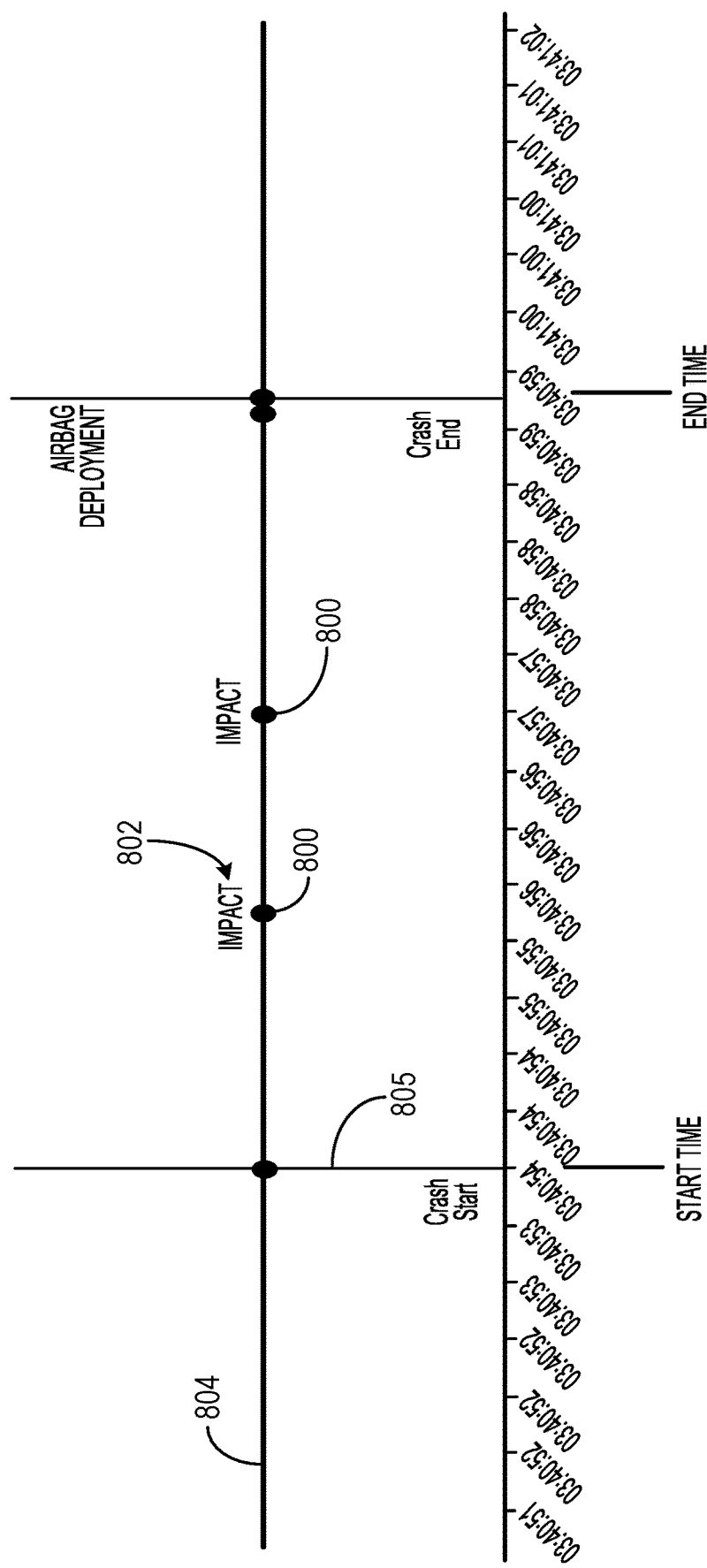

After determining the one or more times of peak acceleration 700 in each axis, the system 200 may merge neighboring peaks to produce what is referred to here as an "acceleration event." For example, the system may merge one or more peaks 701, 703 to produce an acceleration event 800, as shown in FIG. 8. In some implementations, each acceleration event 800 can correspond to at most one peak 700 on each axis of acceleration, although some acceleration events may only contain acceleration data from one or two axes. In some implementations, the system may determine one or more acceleration events 800 using a dynamic programming algorithm in which the input is the one or more times of peak acceleration peak 700 for each of the longitudinal 702, lateral 704, and vertical 706 acceleration signals, and the output is the groupings of these time or times into acceleration events 800 such that no acceleration event contains more than one peak from each axis and no acceleration event contains peaks having times separated by more than, for example, 1 second (or another threshold within a range of 0.2 to 5 seconds). Subject to these constraints, the system may seek to minimize, first, the total number of acceleration events produced and, second, the total sum of time differences between neighboring peaks within all events.

Figure 9:
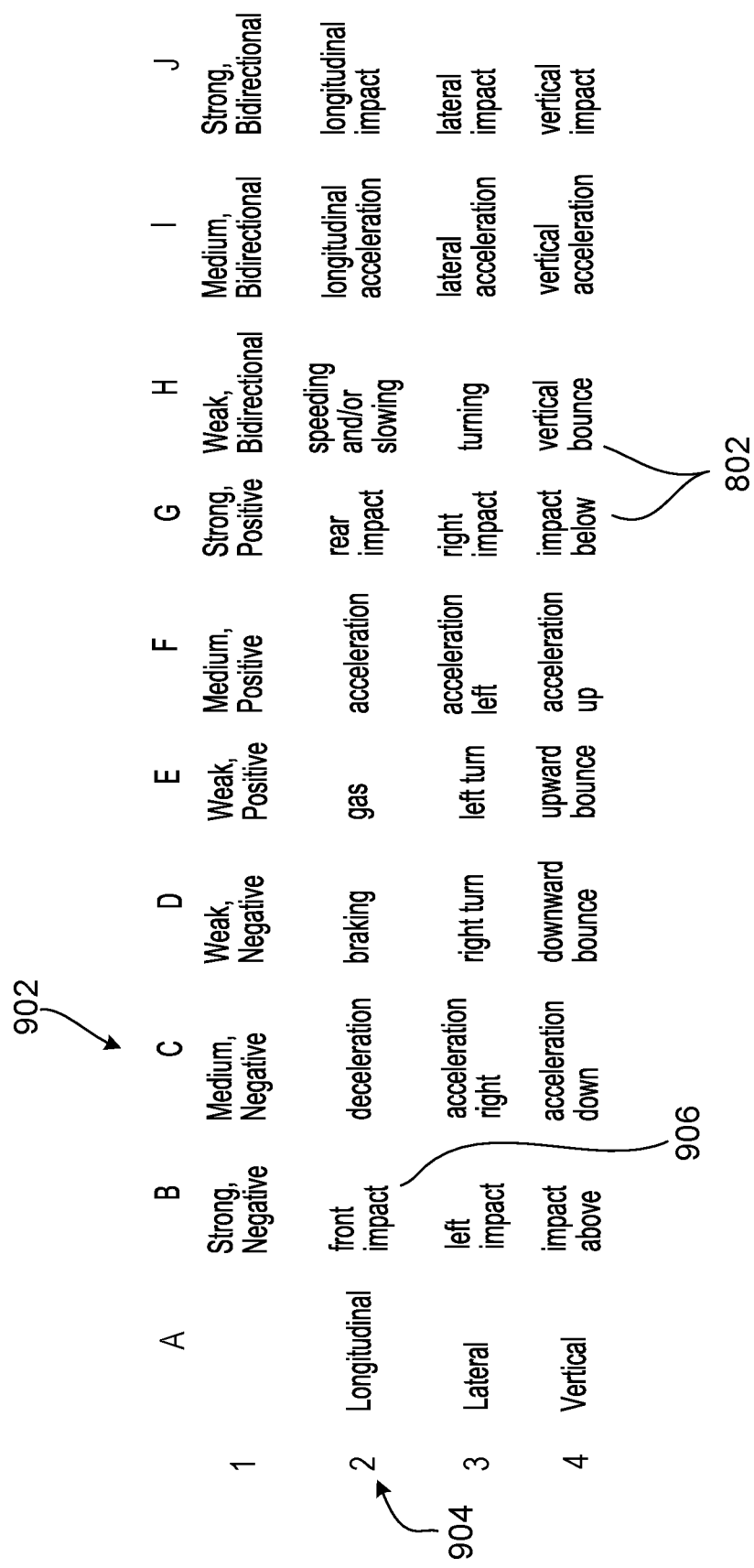
FIG. 9 is a table.

As shown in FIG. 9, in some implementations, the system 200 may process each acceleration event 800 to translate the quantitative acceleration experienced in each axis into a qualitative (in some cases a natural language) description 802 of the acceleration event 800. To do so, the system may apply one or more thresholds based on, for example, direction and intensity, to the quantitative acceleration experienced in each axis during the acceleration event 800. Using this data, the system may sort the acceleration event 800 into one or more bins 902 containing the qualitative description 802 of the acceleration event, as shown in FIG. 9. The qualitative description 802 may indicate, for example, whether the acceleration event 800 was due to an impact and where on the vehicle the impact occurred, whether the acceleration event was due to throttling or braking the vehicle, and whether the acceleration event was the result of turning, and in what direction the vehicle turned, among others. Note that the qualitative descriptions are also associated with the respective axes of acceleration 904.

For instance, if the system determines that there is a strong, negative longitudinal acceleration during the acceleration event 800, the system may associate the qualitative description 906 "front impact" with the acceleration event 800. By synthesizing the qualitative description 906 of the acceleration event 800 with other crash metrics, such as airbag deployment, the system 200 can create an annotated time line 804 of the vehicle crash for use in the human-readable documentation of the crash, as discussed below. Events that occur at specific times 805 during the vehicle crash period can be associated with different points along such a time line visually, in prose, or in a combination of the two.

Figure 10:
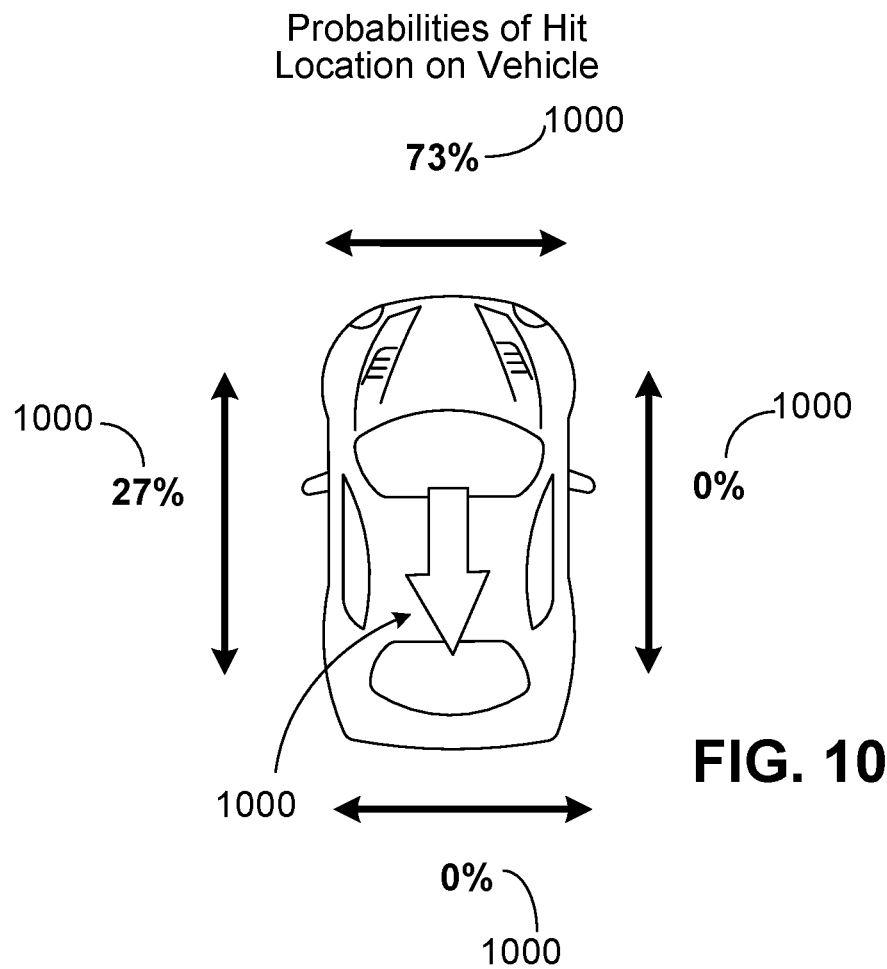
FIG. 10 is a graphical representation of a vehicle.

As shown in FIG. 10, the system 200 may compute a probability of impact 1000 for each of the four sides of the vehicle with respect to an acceleration event. For instance, the system may determine that those axes with the largest acceleration, as reported by the acceleration events 800, their qualitative descriptions 802, or both, have a higher probability of impact 1000. In some implementations, the system may compensate for braking by reducing the probability of impact 1000 for the front of the vehicle, for example. Furthermore, if there are two spikes of lateral acceleration in different directions, the system may determine that the first spike is more likely to be associated with an impact. After determining the probability of impact 1000 for each of the four sides, the system 200 may synthesize the probabilities into a unified best-guess of a direction of impact 1002.

In some implementations, the system 200 may use telematics data or other information to identify and label driver state or behavior, such as continued driving, braking or accelerating or both before impact, swerving, evasive maneuvering, walking after the vehicle crash period, or another action, or combinations of them. For example, the system may compute whether the driver continued driving by checking whether the vehicle's speed exceeded, for example, 20 kph (or another speed threshold within a range of 5 kph to 30 kph) at any point more than 30 seconds (or another time threshold in the range of 0 to 300 seconds) after the end of the vehicle crash period.

To determine whether the driver accelerated or applied the brakes or both before the vehicle crash period or before one or more of the impacts of that occurred during the vehicle crash period, the system may first compute the main impact time, that is, the time of the impact having the largest magnitude of acceleration during the vehicle crash period. Beginning at the start time of the vehicle crash period, the system can then search for the first block of time (e.g., a time segment) lasting at least, for example, 1 second, and during which all longitudinal acceleration samples are less than, for example 3 $m/s^2$ (or a threshold within the range of 1 $m/s^2$ to 20 $m/s^2$). Next, the system may check all longitudinal acceleration samples between the end time of the contiguous block and, for example, 0.5 seconds (or a threshold within the range of 0.1 seconds to 3 seconds) before the main impact time to see whether there are any samples where the longitudinal acceleration is less than a given threshold, such as 0 $m/s^2$ (or a threshold within the range –3 $m/s^2$ to 0 $m/s^2$), and greater than a given threshold, such as 0 $m/s^2$ (or a threshold within the range 0 $m/s^2$ to 3 $m/s^2$). If there are samples below the first threshold and no samples above the second threshold, then the driver may be deemed to have been braking before the impact. If there are no samples below the first threshold and samples above the second threshold, then the driver may be deemed to have been accelerating before the impact. In a more complex example, an analysis can be done to determine whether the driver both accelerated and decelerated before the impact.

The system may also determine whether the driver swerved left or right or both before the one or more of the impacts by determining whether a leftward lateral acceleration peak (i.e., a peak with a lateral acceleration>0 (or a threshold within the range 0 $m/s^2$ to 3 $m/s^2$)) occurred before the main impact time and whether a rightward lateral acceleration peak (i.e., a peak with a lateral acceleration<0 (or a threshold within the range –3 $m/s^2$ to 0 $m/s^2$)) occurred after the main impact time, which indicates a leftward swerve. The system may check for a rightward lateral acceleration peak before the main impact time followed by a leftward lateral acceleration peak after the main impact time, which indicates a rightward swerve (or the converse or a sequence of swerving maneuvers). If neither is present, then the system may determine that a swerve did not occur. Similarly, in some implementations the system may determine whether the driver attempted an evasive maneuver during the vehicle crash period by, for example, determining whether the difference between the speed before the main impact time and the speed at the time of the main impact exceeds a predetermined threshold, such as 5 kph (or a threshold within the range 1 kph to 10 kph).

In more complex analyses, other combinations of such maneuvers during a vehicle crash period may be determined, identified as events on the time line, and expressed either as prose, or visually, or both.

In some implementations, the system can determine whether or not the driver walked away from the vehicle after the vehicle crash period or after an impact. To do so, the system may utilize data received from a device carried by the driver, such as the mobile device 204, to detect a characteristic signature of a human gait, such as described in U.S. Pat. No. 8,457,880B1, entitled "Telematics Using Personal Mobile Devices," the entire contents of which are incorporated here by reference. Walking detection can be useful in understanding the severity of a crash or an impact, for example, by indicating that the driver was not completely disabled, but that the crash or impact was severe enough to warrant leaving the vehicle.

Figure 11:
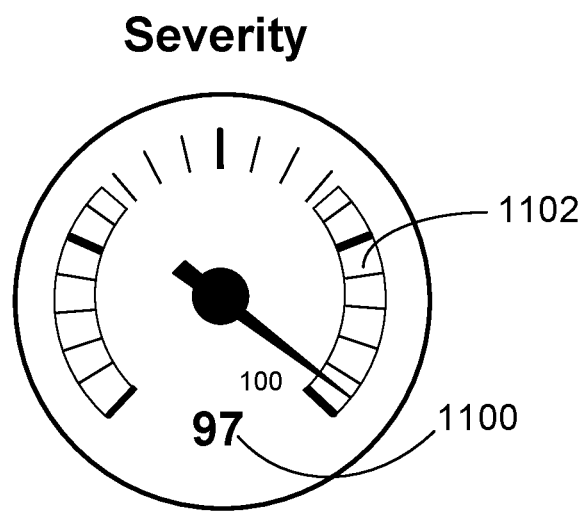
FIG. 11 is a graphical representation of a user interface element.

In some implementations, the system 200 may compute a severity of a vehicle crash (or of an impact). In particular, the system 200 may compute a score (such as a severity score) 1100 of the vehicle crash as shown in FIG. 11, and may provide a severity score meter 1102 including a textual or graphical depiction or both of the severity score 1100 as part of the human-readable documentation of the vehicle crash. The severity score 1100 may be determined by calculating the maximum, average, or weighted average of one or more of the following parameters, or a combination of, with a higher score value indicating a higher severity of the vehicle crash or impact:

Score Name: Score Formula
  speed score: min(impact_speed/130.0, 1)
    i.e., the lesser of 1 and (impact_speed/130)
  delta_v_score: max(min(delta_v/100.0, 1), 0)
    i.e., compute the lesser of (delta_v/100) and 1; if this value is positive, use it; otherwise use 0
  mean_accel_score: max(min(delta_v/delta_t/15.0, 1), 0)
    i.e., compute the lesser of (delta_v/(delta_t*15) and 1; if this value is positive, use it; otherwise use 0
  lon_score: min(abs_lon/25.0, 1)
    i.e., compute the lesser of (abs_lon/25) and 1
  lat_score: min(abs_lat/20.0, 1)
    i.e., compute the lesser of (abs_lat/20) and 1
  airbag_score: 0.0 if airbag_deployed=False; 1.0 if True; 0.5 if Unknown
  direction_score: 1.0 if impact from front; 0.33 if impact from rear; otherwise, such as an impact from the side, 0.67 if delta_v>10
  drive_after_score: 0.0 if user continued driving after the crash; 1.0 otherwise
  braking_score: 0.0 if user braked before impact, or if impact speed was below 20 kph; 1.0 otherwise A wide variety of other factors and formulas, and combinations of them, can be used to determine a severity value or a non-severity value or other measures of the significance, cost, effect, or other characteristics of a vehicle crash or an impact that may be of interest to a user such as an insurance company or a governmental agency or other party.

Referring again to FIG. 4, one or more of the crash metrics described above can be used alone, or with other information, to automatically generate human-readable documentation of an impact or a vehicle crash or both. The documentation can include prose, images, video content, graphical elements, graphs, charts, tables, and other items of content, and combinations of them, assembled and organized in a format that is easily processed and understood by a human user. The system 200 may automatically provide a human-readable documentation of the vehicle crash or vehicle impact based on one or more of the crash metrics, among other information (step 406).

In some implementations, the central server 206 may use, for example, the crash documentation module 312 to generate the human-readable documentation of the vehicle crash or vehicle impact. The central server 206 may then use the communication interface 304 to provide the documentation to one or more other components of the system 200, such as the database 210 for storage, the mobile device 204 using the network 208, or the remote computing device 212 using the network 214, or other devices, or combinations of them.

The human-readable documentation may be provided in a variety of forms or combinations of them, such as paper, a computer-readable file, a set of computer-readable instructions, an email, a web page, a web service, an application, a mobile application, or a notification, among others. Once received, the mobile device 204, the remote computing device 212, or other receiving device may print or display or both the human-readable documentation of the vehicle crash or vehicle impact. In some implementations, the human-readable documentation may be interactive, and the central server 206 may provide the mobile device 204 or the remote computing device 212 with software, such as an application, or an interface, such as an API or a web service, which allows for display, interaction, and further processing of the documentation. In other implementations, the telematics device 202, the mobile device 204, or the remote computing device 212 may generate the human-readable documentation of the vehicle crash and may provide the documentation locally or to the other components in the system 200 for display, interaction, and further processing of the documentation.

The system can also provide aggregated documentation of more than one vehicle crash or impact to enable the user to understand statistical features of the crashes or impacts. The aggregation of information can be done according to geography, time of day, month of the year, demographic characteristics of the operators of the involved vehicles, characteristics of the vehicles, and a variety of other characteristics. In this way, the crash documentation module could construct a narrative spanning multiple crashes which gives English-language descriptions of many impacts (e.g., an English language description of a statistical conclusion about crashes) at a time, e.g., "The majority of impacts which happened within 20 miles of Boston during the month of April 2018 were impacts to the right side of the vehicle".

Furthermore, the technology could provide the raw data used in generating the documentation in a structured way to enable other representations and analyses to be made of the data. For example, the documentation could expose the timestamps, directions, and intensities of all impacts as a list of values. Such values could be used, for example, to produce a pie chart showing the relative amount of damage done to each side of the vehicle during a single crash.

In some cases, the documentation of a crash may be provided verbally (audibly). In that situation, the narrative text would be created as in the description above, but an audible voice would be generated using text-to-speech synthesis software. The narration may be useful for claims adjusters and other operators who cannot easily view a computer screen while assessing one or more crashes or impacts.

The narrative of the documentation can be supplemented with additional features reflecting the driving immediately preceding the impact. For example, the system can indicate whether the driver is familiar with the road they are driving on. Familiarity can be determined by examining the past history of drives over a fixed period of time, such as 28 days (or a period of time within the range of 1 day to 1 year) and examining the road segments extracted from a map-matched trajectory; if the road segment or segments involved in the crash has been driven on 2 or fewer times within the period of time (or a threshold within the range 0 to 20), then the road segment is considered "unfamiliar". GPS positions can be used instead of map-matched road segments if map-matching is unavailable. If the driver appears to be unfamiliar with the road in the sense above, the textual narrative would be appended with a sentence similar to "The driver has only driven once on this road in the past 28 days". Alternately, if the road segment is considered "familiar", a sentence could be added such as "The driver is familiar with this road and has driven on it 14 times in the past 28 days."

Second, information about phone calls preceding the vehicle crash can also be included in the narrative. In particular, by polling the system API on the smart phone for call state information and transmitting this information to a server in the cloud, the system can determine if the user placed a call and may be able to detect if the call was on a hands-free device or on the handset. If a call was placed, sentences can be appended to the textual narrative such as "3 minutes prior to the crash. The call ended 30 seconds prior to the crash."

Third, information about whether the driver appeared to be walking immediately after the crash could be included in the narrative. This could be determined by using the acceleration data from the driver's phone or by using walking classifiers native to the phone. From this data, a sentence could be appended to the narrative, of the form "The driver exited their vehicle and walked around after the crash".

The users of the human-readable document can include insurance companies, governmental agencies, private companies, vehicle owners, vehicle manufacturers, road designers, and a variety of other parties.

Figure 12A:
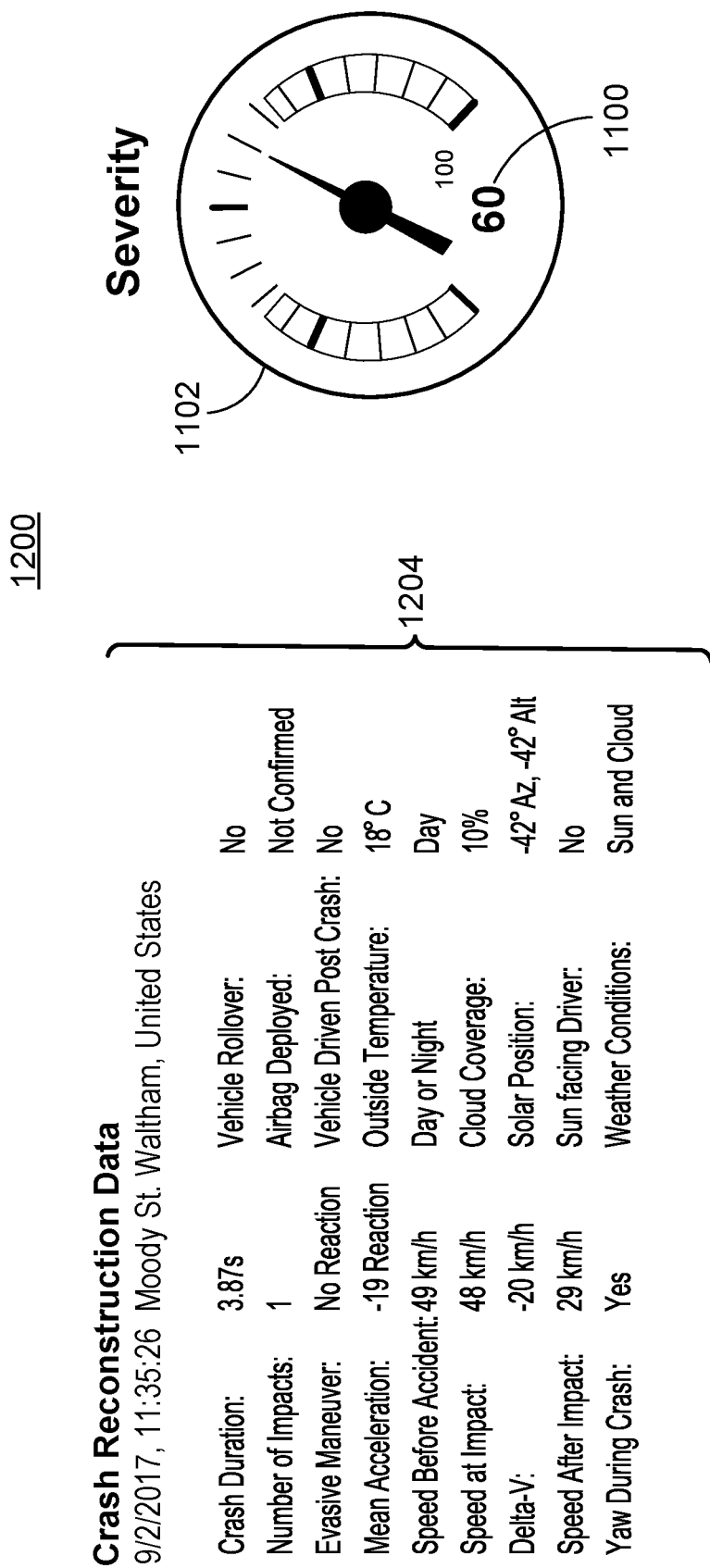
FIG. 12A is a documentation of a crash.

FIGS. 12A-D illustrate an example of a human-readable documentation of a vehicle crash 1200. In general, the human-readable documentation of the vehicle crash 1200 may include, for example, a textual description 1201, a graphical description 1202, any of the other types of content mentioned above, or combinations of them, of the vehicle crash that refers to one or more features and metrics or other information about the vehicle crash. Referring to FIG. 12A, in some implementations, the documentation 1200 may include a natural language description of the vehicle crash including, for example, English sentences that refer to one or more of the location of the vehicle crash, the date of the vehicle crash, the time of the vehicle crash or of features during the vehicle crash period, the duration of the vehicle crash, the severity of the vehicle crash, the minimum, maximum, average, or instantaneous speed and acceleration of the vehicle before, during, and after the vehicle crash, the change in speed and acceleration during the vehicle crash, the gyroscopic orientation and angular velocity of the vehicle during the vehicle crash, the number of impacts during the vehicle crash, the direction of impacts during the vehicle crash, the yaw of the vehicle during the vehicle crash, whether a vehicle airbag deployed, whether the vehicle rolled over, whether the driver of the vehicle attempted any evasive maneuvers and what the maneuvers were, whether the vehicle's brakes or throttle were used during the vehicle crash period, whether there was time for the driver to slow down before the impacts of the vehicle crash, whether the vehicle was driven after the vehicle crash period, whether the driver exited the vehicle after the vehicle crash period, the driver's gait after the vehicle crash period, environmental conditions during the vehicle crash period, such as the weather conditions, the temperature, the cloud coverage, the solar position, and whether the sun was facing the driver, raw telematics data for the vehicle crash period, crash metrics data during the vehicle crash period, and other features and combinations of them related to the vehicle crash.

For example, the natural language description 1202 of the vehicle crash could state the following with respect to a particular vehicle crash: "The driver was traveling down Moody St., Waltham, United States at 49 km/h at 11:35:26 on Sep. 2, 2017. At 11:35:28 a collision occurred on the left side of the vehicle while the vehicle was traveling at 48 km/h. The collision event ended at 11:35:30 when the vehicle reached a speed of 29 km/h. The vehicle was yawing during the crash. The driver did not continue on their trip after the crash event."

In some implementations, the human-readable documentation of the vehicle crash 1200 may include crash reconstruction data 1204 to provide a textual or graphical summary of crash metrics and other features related to the vehicle crash. The documentation 1200 may include the severity score meter 1102 to provide a textual and graphical depicture of the severity score 1100 for the vehicle crash.

Figure 12B:
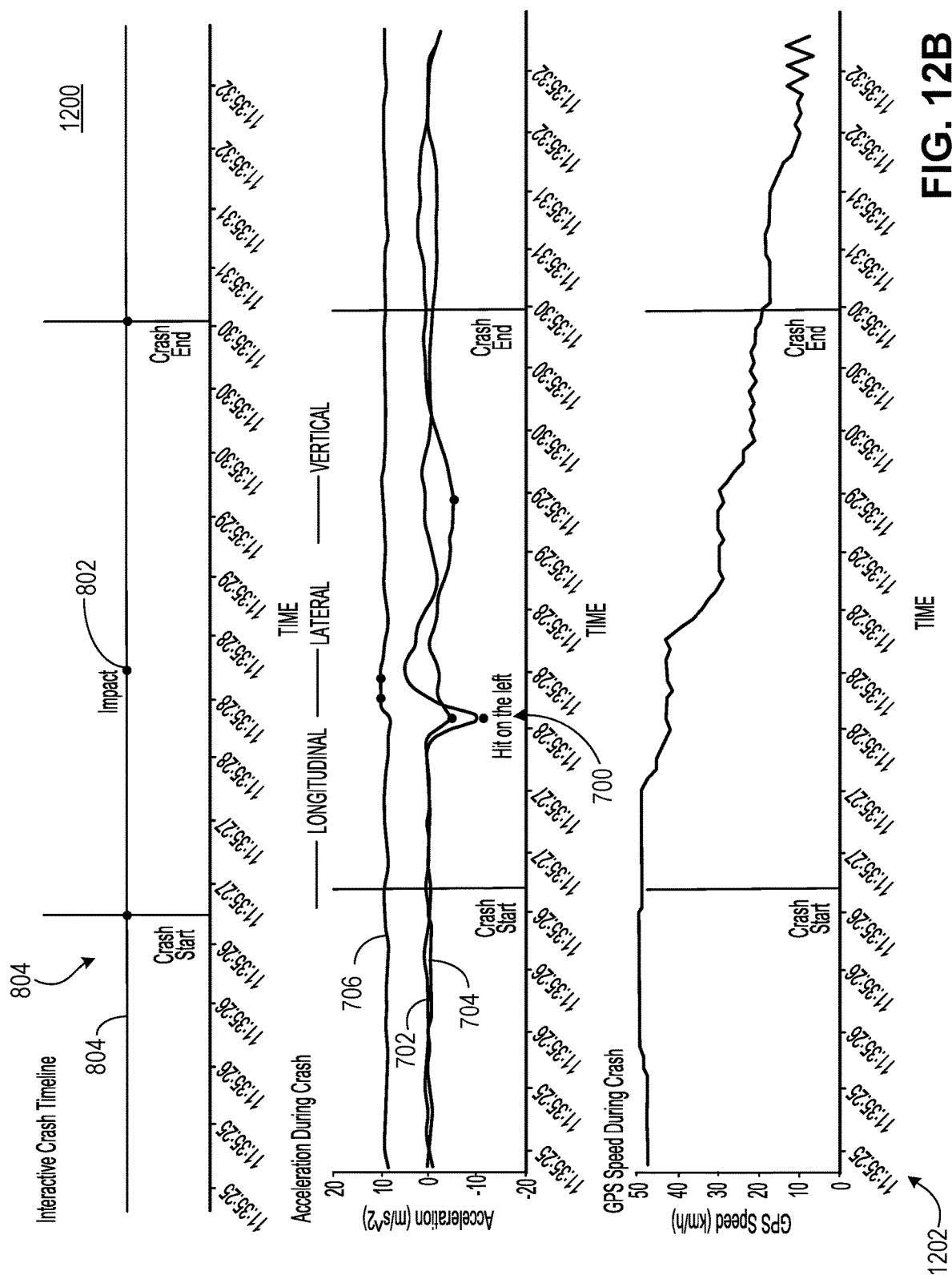
FIG. 12B is a plot of telematics data during the crash.

As shown in FIG. 12B, the human-readable documentation of the vehicle crash 1200 may include the annotated timeline 804 of the vehicle crash. As described above, the annotated timeline 804 may include the one or more acceleration events 800 or other events, their qualitative descriptions 802, and indicators of other metrics or features related to the vehicle crash. In some implementations, the documentation 1200 can include the longitudinal 702, lateral 704, and vertical 706 acceleration signals with indicators for the one or more acceleration peaks 700 as discussed with reference to FIG. 7.

Figure 12C:
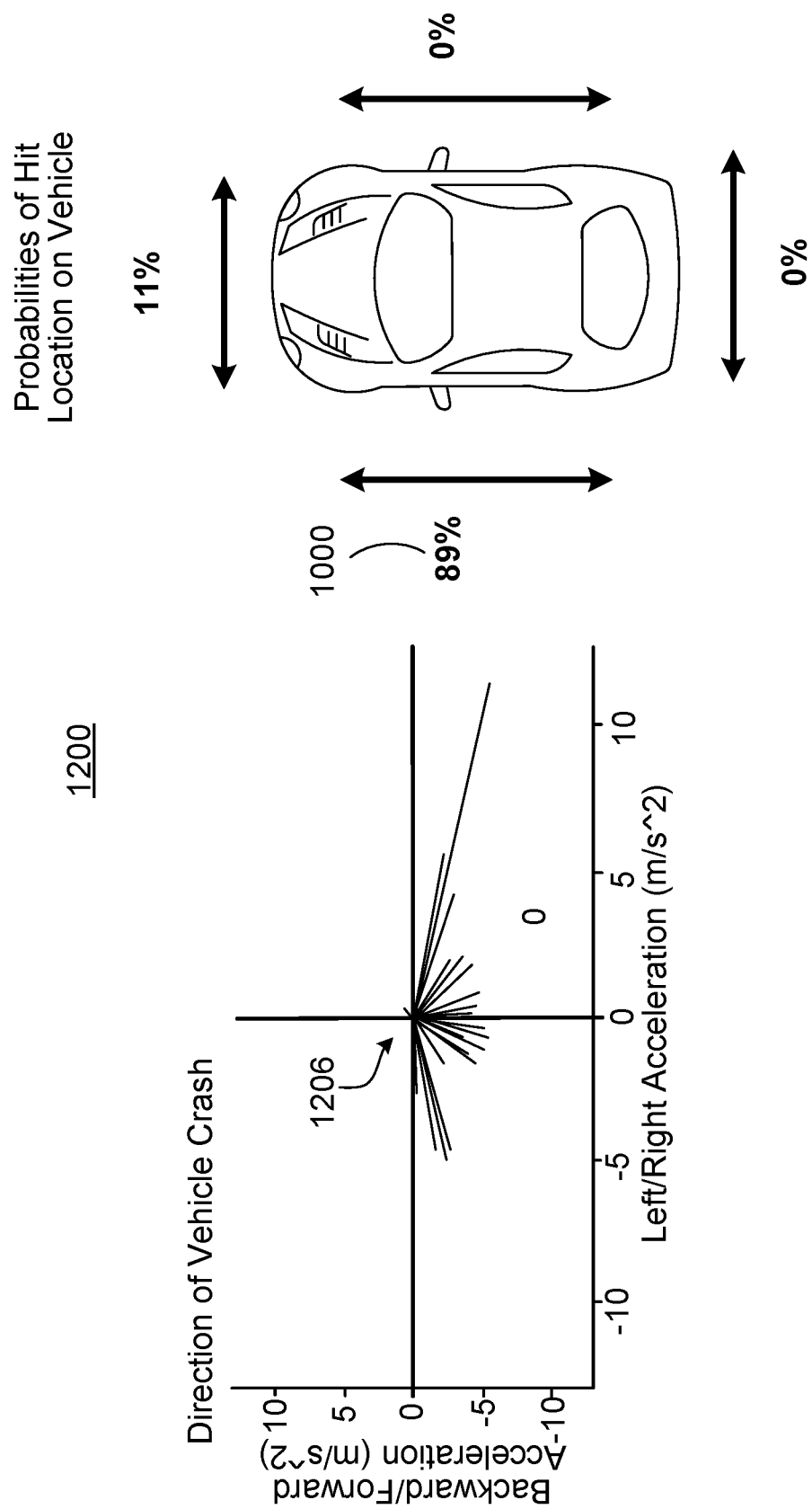
FIG. 12C is a graphical representation of a vehicle and a graph of acceleration.

The documentation 1200 can include textual or graphical representations of other telematics data, such as the GPS speed of the vehicle during the vehicle crash period, or the lateral, longitudinal, and/or vertical acceleration experienced by the vehicle during the vehicle crash period. For instance, the documentation 1200 may include a line segment plot 1206 for every point of lateral and longitudinal acceleration experienced by the vehicle during the vehicle crash period as shown in FIG. 12C. In some implementations, the documentation 1200 can include a visualization of the probability of impact 1000 for each of the four sides of the vehicle and a unified best-guess of the direction of impact (not shown).

Figure 12D:
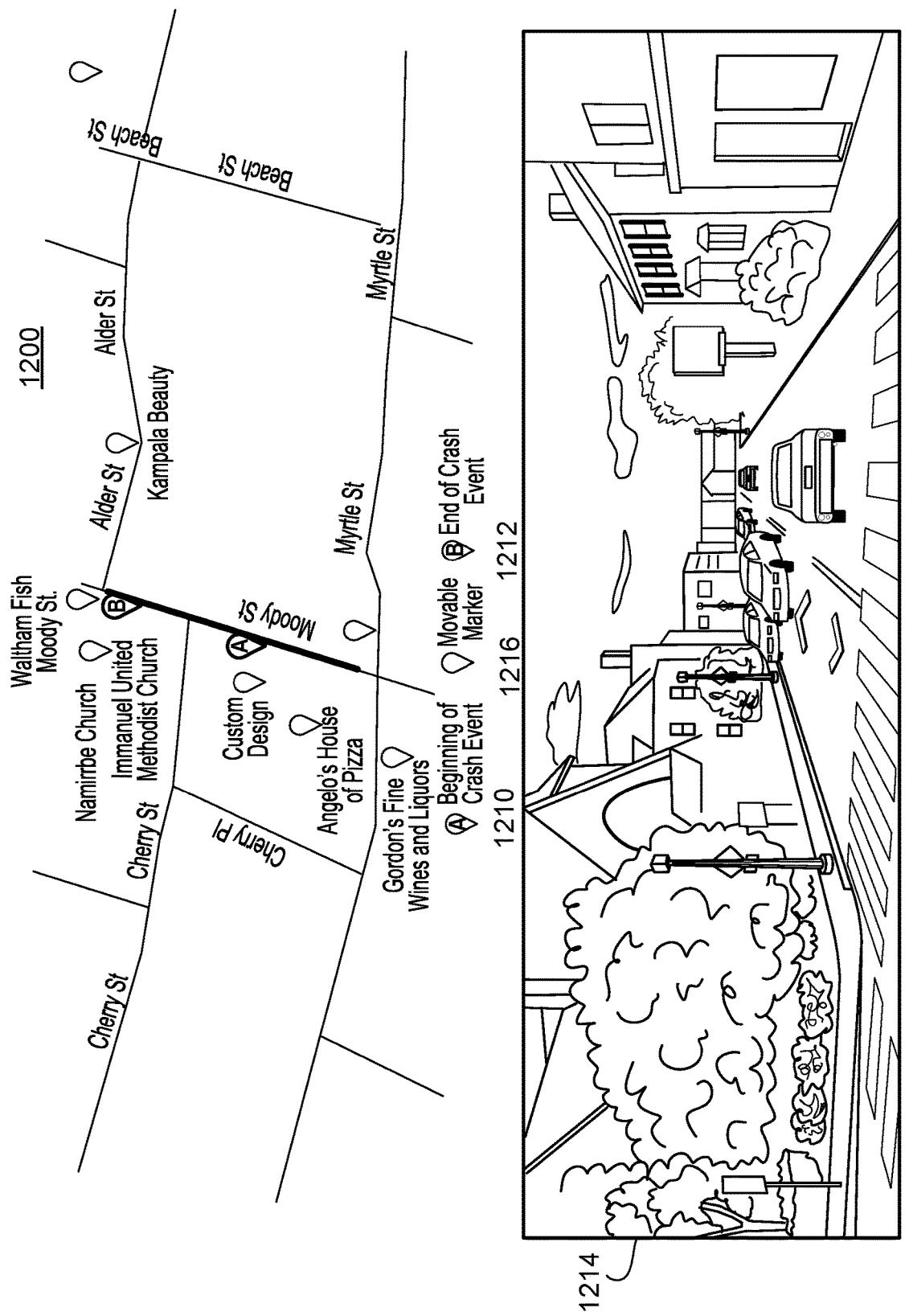
FIG. 12D is a map and a three-dimensional view of a road.

As shown in FIG. 12D, in some implementations, the documentation 1200 may include a map 1208 of the crash. The map 1208 of the crash can include markers indicating the GPS position of a start 1210 and an end 1212 of the vehicle crash or vehicle crash period. The documentation 1200 may include a street view 1214 of the vehicle crash containing images of the street and surrounding area where the vehicle crash took place. In some implementations, a user may interact with the street view 1214 to rotate the view or move the view along the street, such as by using a movable marker 1216 placed on map 1208.

In some implementations, the documentation of a vehicle crash is produced as follows. As mentioned above, from the telematics data the following features of a crash can be derived, among others: the crash extent (e.g., the crash duration), the speed of the vehicle at the beginning and end of the crash period, the timestamps of impacts that occurred during the crash period, whether the driver continued driving to their destination after the crash, whether the vehicle rolled over during the crash, whether the airbag deployed during the crash, and whether the driver took a swerving or braking action prior to the first impact. From these features, the system computes several more features in order to produce the crash narrative.

The system computes the timestamp of the largest impact by comparing all impacts and taking the timestamp of the one with the largest deviation from gravity.

The system computes the latitude and longitude of the crash as the latitude and longitude reading in the telematics data that is closest to the timestamp of the largest impact.

The system computes whether the driver was facing the sun at the time of the impact as whether the solar azimuth and GPS bearing differed by fewer than 45 degrees and the sky was sunny or partly cloudy (as determined, for example, by querying a database of weather observations) and the solar altitude was between 0 and 45 degrees at the time of the largest impact.

The system computes the most-damaged side of the car by taking each impact direction and assigning it a severity and a direction (as described previously in the disclosure) and summing the total weight over each of the directions left, right, front and rear in order to determine the direction of maximum hit intensity.

The system computes whether the car was yawing during the crash as whether the gyroscope's measured oriented yaw rate exceeded 6 radians per second at the time of the largest impact.

The system computes the name of the street where the impact occurred by querying a map database to determine the street closest to the latitude and longitude of the impact.

With the above values determined the crash documentation module generates a narrative according to the following procedure:

The module starts with the phrase "The driver was traveling down STREET_LOCATION at CRASH_START_SPEED km/h at CRASH_START_TIME." STREET_LOCATION is the written-language description of the street, e.g., "Main St, Lincoln, Nebraska". CRASH_START_SPEED is the speed at the beginning of the crash period in kph. CRASH_START_TIME is the written-language time of the beginning of the crash, eg. "12:01:45 on Jun. 4, 2018".

If only a braking maneuver was attempted, the module appends to the narrative the phrase "The driver then began braking prior to the impact." If only a swerving maneuver was attempted, the module appends to the narrative the phrase "The driver began swerving prior to the impact". If both a braking and a swerving were attempted, the module appends to the narrative the phrase "The driver began braking and swerving prior to the impact."

If the module determined what was the most-damaged side of the car, the module appends to the narrative the phrase "At LARGEST_IMPACT_TIME a collision occurred on the HIT_DIRECTION side of the vehicle while the vehicle was traveling at LARGEST_IMPACT_SPEED km/h. The collision event ended at CRASH_END_TIME when the vehicle reached a speed of CRASH_END_SPEED km/h." Otherwise, the module appends the phrase "At LARGEST_IMPACT_TIME a collision occurred while the vehicle was traveling at LARGEST_IMPACT_SPEED km/h. The collision event ended at CRASH_END_TIME when the vehicle reached a speed of CRASH_END_SPEED km/h." LARGEST_IMPACT_TIME is the written-language time of the largest impact, eg. "12:01:46 on Jun. 4, 2018". HIT_DIRECTION is one of "left", "right", "front", or "rear". LARGEST_IMPACT_SPEED is the speed at the time of largest impact in kph. CRASH_END_TIME is the written-language time of the end of the crash period, eg. "12:01:48 on Jun. 4, 2018". CRASH_END_SPEED is the speed at end of the crash period in kph.

If the vehicle was determined to be yawing, the module appends to the narrative the phrase "The vehicle was yawing during the crash."

If the module determined that the airbag deployed, the module appends to the narrative the phrase "The airbag deployed at AIRBAG_DEPLOY_TIME." AIRBAG_DEPLOY_TIME is the written-language time of airbag deployment, eg. "12:01:47 on Jun. 4, 2018"

If the module determined that the vehicle rolled over, the module appends to the narrative the phrase "The vehicle rolled over as a result of the collision."

If the module determined that the driver was facing the sun, the module appends to the narrative the phrase "The driver was driving into the sun, which may have caused glare and/or poor visibility."

If the module determined that the driver continued driving, the module appends to the narrative the phrase "The driver continued driving after the crash event toward their destination." Otherwise, we append to the narrative the phrase "The driver did not continue on their trip after the crash event."

A wide variety of other data elements can form the basis of elements of the narrative. And the narrative can be phrased in a broad range of ways for a given set of data elements.

Other implementations are also within the scope of the following claims.

The invention claimed is:

1. A computer-implemented method for reporting a potential vehicle crash, the method comprising:
   receiving, by at least one processor and from a storage device, telematics data produced by a plurality of sensors at a vehicle, wherein the plurality of sensors comprise a pressure sensor and a position sensor, and wherein the telematics data comprises a pressure within the vehicle produced by the pressure sensor and a position of the vehicle produced by the position sensor;
   identifying, by the at least one processor and based on the telematics data, a start time of the potential vehicle crash and an end time of the potential vehicle crash;
   processing, by the at least one processor, a portion of the telematics data produced between the start time and the end time of the potential vehicle crash to determine whether an airbag associated with the vehicle was deployed during the potential vehicle crash, including:
      computing, by the at least one processor, a first rate of altitude change based on the pressure within the vehicle produced by the pressure sensor;
      computing, by the at least one processor, a second rate of altitude change based on the position of the vehicle produced by the position sensor;
      computing, by the at least one processor, a difference between the first rate of altitude change and the second rate of altitude change; and
      determining, by the at least one processor, whether the airbag associated with the vehicle was deployed during the potential vehicle crash by comparing the difference with a predetermined threshold;
   generating, by the at least one processor, a report of the potential vehicle crash, the report including an indication of whether the airbag associated with the vehicle was deployed during the potential vehicle crash; and
   transmitting the report to a device for analysis of the potential vehicle crash or a driver of the vehicle during the potential vehicle crash.

2. The method of claim 1, wherein the report is generated in response to determining that the potential vehicle crash was an actual vehicle crash.

3. The method of claim 1, wherein the report comprises a human-readable narrative description of features of the potential vehicle crash.

4. The method of claim 3, wherein generating the report comprises assembling predetermined prose phrases corresponding to the features of the potential vehicle crash.

5. The method of claim 4, wherein the prose phrases identify at least one of (a) times, (b) locations or orientations, or (c) speeds.

6. The method of claim 1, comprising determining that the potential vehicle crash was an actual vehicle crash based on a determination that the vehicle was not driven after the end time of the potential vehicle crash.

7. The method of claim 1, wherein the plurality of sensors are included in a telematics device at the vehicle.

8. The method of claim 7, wherein the telematics device comprises a mobile device.

9. The computer-implemented method of claim 1, further comprising:
   determining, by the at least one processor, a severity of the potential vehicle crash based on the telematics data and a determination of whether the vehicle was driven after the end time of the potential vehicle crash;
   wherein the report includes an indication of the severity of the potential vehicle crash.

10. The computer-implemented method of claim 1, further comprising:
    determining, by the at least one processor and based on the telematics data, that the vehicle was not driven after the end time of the potential vehicle crash; and
    determining, by the at least one processor and based on the telematics data, a stopping location of the vehicle after the end time of the vehicle crash;
    wherein the report includes an indication of the stopping location of the vehicle after the end time of the potential vehicle crash.

11. The computer-implemented method of claim 1, further comprising:
    determining, by the at least one processor and based on the telematics data, that the vehicle was not driven after the end time of the potential vehicle crash; and
    determining, by the at least one processor and based on the telematics data, a state of the vehicle after the end time of the vehicle crash;
    wherein the report includes an indication of the state of the vehicle after the end time of the potential vehicle crash.

12. A system, comprising:
    at least one processor; and
    memory storing instructions executable by the at least one processor to perform operations comprising:
       receiving telematics data produced by a plurality of sensors at a vehicle, wherein the plurality of sensors comprise a pressure sensor and a position sensor, and wherein the telematics data comprises a pressure within the vehicle produced by the pressure sensor and a position of the vehicle produced by the position sensor;

identifying, based on the telematics data, a start time of a potential vehicle crash and an end time of the potential vehicle crash;

processing a portion of the telematics data produced between the start time and the end time of the potential vehicle crash to determine whether an airbag associated with the vehicle was deployed during the potential vehicle crash, including:

computing a first rate of altitude change based on the pressure within the vehicle produced by the pressure sensor;

computing a second rate of altitude change based on the position of the vehicle produced by the position sensor;

computing a difference between the first rate of altitude change and the second rate of altitude change; and determining whether the airbag associated with the vehicle was deployed during the potential vehicle crash by comparing the difference with a predetermined threshold;

generating a report of the potential vehicle crash, the report including an indication of whether the airbag associated with the vehicle was deployed during the potential vehicle crash; and transmitting the report to a device for analysis of the potential vehicle crash or a driver of the vehicle during the potential vehicle crash.

13. The system of claim 12, wherein the report is generated in response to determining that the potential vehicle crash was an actual vehicle crash.

14. The system of claim 12, wherein the report comprises a human-readable narrative description of features of the potential vehicle crash.

15. The system of claim 14, wherein generating the report comprises assembling predetermined prose phrases corresponding to the features of the potential vehicle crash.

16. The system of claim 15, wherein the prose phrases identify at least one of (a) times, (b) locations or orientations, or (c) speeds.

17. The system of claim 12, wherein the memory stores instructions executable by the at least one process to perform operations comprising determining that the potential vehicle crash was an actual vehicle crash based on a determination that the vehicle was not driven after the end time of the potential vehicle crash.

18. A non-transitory computer-readable medium storing instructions executable by at least one processor to perform operations comprising:

receiving telematics data produced by a plurality of sensors at a vehicle, wherein the plurality of sensors comprise a pressure sensor and a position sensor, and wherein the telematics data comprises a pressure within the vehicle produced by the pressure sensor and a position of the vehicle produced by the position sensor;

identifying, based on the telematics data, a start time of a potential vehicle crash and an end time of the potential vehicle crash;

processing a portion of the telematics data produced between the start time and the end time of the potential vehicle crash to determine whether an airbag associated with the vehicle was deployed during the potential vehicle crash, including:

computing a first rate of altitude change based on the pressure within the vehicle produced by the pressure sensor;

computing a second rate of altitude change based on the position of the vehicle produced by the position sensor;

computing a difference between the first rate of altitude change and the second rate of altitude change; and determining whether the airbag associated with the vehicle was deployed during the potential vehicle crash by comparing the difference with a predetermined threshold;

generating a report of the potential vehicle crash, the report including an indication of whether the airbag associated with the vehicle was deployed during the potential vehicle crash; and transmitting the report to a device for analysis of the potential vehicle crash or a driver of the vehicle during the potential vehicle crash.

19. The non-transitory computer-readable medium of claim 18, wherein the report is generated in response to determining that the potential vehicle crash was an actual vehicle crash.

20. The non-transitory computer-readable medium of claim 18 storing instructions executable by at least one processor to perform operations comprising determining that the potential vehicle crash was an actual vehicle crash based on a determination that the vehicle was not driven after the end time of the potential vehicle crash.

* * * * *